(12) United States Patent
Obata et al.

(10) Patent No.: US 6,728,199 B2
(45) Date of Patent: Apr. 27, 2004

(54) DISK CARTRIDGE

(75) Inventors: Manabu Obata, Kanagawa (JP); Mitsunori Matsumura, Tokyo (JP)

(73) Assignee: Sony Corporation, Tokyo (JP)

( * ) Notice: Subject to any disclaimer, the term of this patent is extended or adjusted under 35 U.S.C. 154(b) by 403 days.

(21) Appl. No.: 09/821,483

(22) Filed: Mar. 29, 2001

(65) Prior Publication Data

US 2001/0055270 A1 Dec. 27, 2001

(30) Foreign Application Priority Data

Mar. 31, 2000 (JP) ........................................ 2000-099060

(51) Int. Cl.[7] ................................................. G11B 3/70
(52) U.S. Cl. ....................................................... 369/291
(58) Field of Search ........................ 360/133; 269/291; 206/308.1, 308.2, 308.3, 387.11

(56) References Cited

U.S. PATENT DOCUMENTS 4,695,911 A * 9/1987 Loosen ........................ 360/133
6,473,392 B2 * 10/2002 Shiomi et al. .............. 369/291

* cited by examiner

Primary Examiner—David Davis
(74) Attorney, Agent, or Firm—Frommer Lawrence & Haug LLP; William S. Frommer

(57) ABSTRACT

In a disk cartridge including a cartridge housing (22), an optical disk (21) and a shutter mechanism (28), a butt portion (71a) of at least one shutter member of a pair of shutter members (50), (51) includes a recess portion (75) into which the other butt portion (72a) is inserted. A space produced between the shutter members (50), (51) of the shutter mechanism (28) comprising the first shutter member (50) and the second shutter member (51) can be reduced as much as possible. The disk cartridge is made dustproof by suppressing dusts or the like from entering a disk compartment in which a disk-like recording medium is accommodated.

8 Claims, 33 Drawing Sheets

DISK CARTRIDGE

BACKGROUND OF THE INVENTION

1. Field of the Invention

The present invention generally relates to a disk cartridge in which a disk-like recording medium such as an optical disk, a magneto-optical disk and a magnetic disk is accommodated within a cartridge housing so as to become freely rotatable. More particularly, this invention relates to a disk cartridge in which a shutter mechanism capable of opening an opening portion of a cartridge housing to expose a part of a disk-like recording medium includes a first shutter member and a second shutter member.

2. Description of the Related Art

As a disk cartridge in which a disk-like recording medium capable of recording and/or reproducing information such as audio data, video data or data of computers is accommodated within a cartridge housing so as to become freely rotatable, there has hitherto been known a disk cartridge having an arrangement shown in FIG. 1, for example. A disk cartridge, generally depicted by reference numeral 1 in FIG. 1, is a disk cartridge which houses therein a write once read many magneto-optical disk 4 on which users can record and write information such as data of computers later on. FIG. 1 is a schematic perspective view showing an outward appearance of the disk cartridge 1.

Specifically, as shown in FIG. 1, this disk cartridge 1 includes a cartridge housing 2 comprised of a pair of an upper shell 2a and a lower shell 2b, a magnetooptical disk 4 rotatably accommodated within a disk compartment 3 of this cartridge housing 2, or the like. An opening portion 5 which extends from the center portion to one side is formed on both of the upper and lower surfaces of the cartridge housing 2. This opening portion 5 can be opened and closed by a shutter member 6 which can slide along one side of the cartridge housing 2. A presser member 6a is used to protect a tip end portion of the shutter member 6 from being disengaged out of both upper and lower surfaces of the cartridge housing 2.

A disk-like center hub 7 made of a metal is provided at the center portion of the magneto-optical disk 4. The center hub 7 is opposed to the inner end portion of the opening portion 5. Although not shown, a turntable provided on the body of the information recording and reproducing apparatus is mounted on the center hub 7. When the magneto-optical disk 4 is chucked to the turntable, the magneto-optical disk 4 can be rotated at a predetermined velocity (e.g., constant linear velocity). In this case, an information signal is recorded on or reproduced from the magneto-optical disk 4 by a magneto-optical pickup device the head portion of which is inserted into the opening portion 5.

However, a conventional disk cartridge having the above arrangement, the shutter member 6 which opens and closes the opening portion 5 is formed as substantially a U-shape in cross section. This shutter member 6 is fitted into one side of the cartridge housing 2 and the shutter member 6 slides along the above one side of the cartridge housing 2 to open and close the opening portion 5. As a consequence, a large space is produced between the cartridge housing 2 and the shutter member 6 so that very small dusts or the like cannot be prevented from entering into the disk cartridge 2 from the above large space.

In the current in which optical disks are increasing their storage capacities and are increasing their recording densities in recent years, the pitches of the recording patterns are becoming narrower and the linear density is increasing. When read or write beams are interrupted on the recording surface smudged by dusts or the like, or the information recording surface is scratched, information cannot be read out from or cannot be written in the optical disk or the magneto-optical disk normally. To solve this problem, in the disk cartridge according to the related art, as shown in FIG. 1, the shutter member 6 having substantially the U-shape cross section is attached to one side of the cartridge housing 2 so as to become slidable. When the shutter member 6 is slid along the above one side of the disk cartridge 2, the opening portion 5 is opened or closed to protect the information recording surface of the optical disk or the like from being smudged or scratched by dusts or the like.

As the optical disk or the magneto-optical disk is increasing its storage capacity more and is also increasing its recording density more, very small dusts which had been negligible become more influential on the optical disk or the magneto-optical disk 4 when information is written in or read out from the optical disk or the magneto-optical disk 4. The above shutter member 6 whose cross-section is substantially the U-shape cannot satisfactorily protect very small dusts or the like from entering into the cartridge housing 2. In this case, when the information recording surface of the magneto-optical disk 4 is smudged by very small dusts or the like entered into the cartridge housing 2, the information recording surface is brought to the state similar to the state in which the information recording surface is smudged and scratched by dusts or the like with the result that information cannot be normally read out or written in the information recording surface of the magneto-optical disk 4.

In view of the above aspect, the assignee of the present application has previously proposed a patent application concerning a disk cartridge shown in FIG. 2 (see Japanese patent application No. 11-195044). As shown in FIG. 2, a disk cartridge, generally depicted by reference numeral 8, includes a cartridge housing 9 comprised of an upper shell 9a and a lower shell 9b, an optical disk 11 accommodated within a disk compartment 10 of this cartridge housing 9, a shutter mechanism 13 for opening and closing an opening portion 12 which is formed through the cartridge housing 9 so as to expose a part of this optical disk 11, a cover member 14 attached to the cartridge housing 9 so as to protect this shutter mechanism 13, or the like.

The cartridge housing 9 is formed by joining and fastening the upper shell 9a and the lower shell 9b. The optical disk 11 is accommodated within the disk compartment 10 of this cartridge housing 9 so as to become freely rotatable. The cover member 14 is attached to the lower shell 9b of this cartridge housing 9 so as to cover the shutter mechanism 13. This cover member 14 can protect the shutter mechanism 13 and can prevent the cartridge housing 9 from being smudged by dusts or the like.

The shutter mechanism 13 of the disk cartridge 8 is comprised of a first shutter member 15 and a second shutter member 16. The first shutter member 15 is used to open and close the opening portion 12 defined on the cartridge housing 9 at its recording and/or reproducing opening portion into and from which an optical pickup device of a disk recording and reproducing apparatus is inserted and ejected. The first shutter member 15 is comprised of a shutter portion 15a and a belt-like portion 15b. The shutter portion 15a is shaped as substantially a trapezoid in which one oblique side is shaped as a circular arc. The belt-like portion 15b is extended from this circular arc-like oblique side. The belt-like portion 15b includes a circular arc-like guide portion 15b1 continued to one side of the circular arc-like oblique side and which has a radius of curvature of approximately the same as that of the circular arc-like oblique side and a rectilinear guide 15b2 continued to the other side of the circular arc-like oblique side and which is protruded from the other side rectilinearly.

This belt-like portion 15b is movably accommodated within a guide portion 17 formed between an inner wall 9a1 of the upper shell 9a and a peripheral wall 9b1 of the lower shell 9b. The guide portion 17 is shaped like a circular arc so as to surround the disk compartment 10. One end of this guide portion 17 is closed by a side wall 9a2 of the lower shell 9b. On the other hand, the other end of the guide portion 17 is opened to a side wall 9a3 of the upper shell 9a and an operating portion 13a provided at the tip end of the rectilinear guide 15b2 is exposed from the opening portion. When the operating portion 13a is pressed and moved within a guide groove 17b defined on the side surface of the cartridge housing 9 and thereby moved on the back side, the first shutter member 15 is changed from the state shown in FIG. 3 to the state shown in FIG. 4. As a result, the shutter portion 15a is rotated and changed to open the recording and/or reproducing opening portion of the opening portion 12.

As the first shutter member 15 is rotated, the second shutter member 16 is rotated in the opposite side of the first shutter member 15. Specifically, the second shutter member 16 is rotatably supported to the cartridge housing 9 by a support pin 16a at one corner portion of the back side of the cartridge housing 9. The other end of the second shutter member 16 is extended up to the center portion of the cartridge housing 9 and is spring-biased to the side of the shutter member 15 under spring force of a coil spring 18, whereby an engagement portion 16b formed at the front end edge of the second shutter member 16 is brought in contact with a convex portion 15c formed at the rear end edge of the first shutter member 15.

The convex portion 15c of the first shutter member 15 is located at substantially the center portion of the front and rear direction of the cartridge housing 9 as shown in FIG. 3 under the condition that the first shutter member 15 closes the opening portion 12. In this state, as shown in FIG. 4, when the first shutter member 15 is rotated to open the opening portion 12, the convex portion 15c is moved to the back side of the cartridge housing 9. As a consequence, movement force of the convex portion 15c acts on the engagement portion 16b and the second shutter member 16 is withdrawn to the back side against the spring force of the coil spring 18. When the second shutter member 16 is rotated, of the opening portion 12, there is opened and closed a drive opening portion into and from which the turntable of the rotary drive mechanism is inserted and ejected.

In the above disk cartridge 8 according to the related art, since the shutter mechanism 13 is comprised of a combination of the two shutter members 15, 16 and the shutter mechanism 13 is protected by the cover member 14, there can be achieved an effect that dusts or the like can be effectively protected from entering the cartridge housing 9.

However, in the first shutter member 15 and the second shutter member 16, the engagement portion 16b is spring-biased and engaged with the convex portion 15c under spring force of the coil spring 18 and the respective end faces of the pair of the shutter members 15, 16 are butted with each other under spring force of the coil spring 18 to thereby close the opening portion 12. As a result, it is unavoidable that a space is produced between the end faces of the butting portions of the first and second shutter members 15 and 16 and that dusts or the like enter into the cartridge housing 9 from the above space.

SUMMARY OF THE INVENTION

In view of the aforesaid aspect, it is an object of the present invention to provide a disk cartridge in which butting portions of a pair of shutter members are overlapping with each other when a shutter mechanism is closed so that a coupling portion of the pair of shutter members have a labyrinth function to effectively suppress or prevent dusts or the like from entering the disk cartridge.

According to an aspect of the present invention, there is provided a disk cartridge which is comprised of a cartridge housing formed of a pair of shells so as to form therein a disk compartment, a disk-like recording medium accommodated within the disk compartment so as to become freely rotatable and a shutter mechanism having a pair of shutter members attached to the cartridge housing, the pair of shutter members rotatably coupled to each other and the respective shutter portions being butted to each other to close an opening portion of the cartridge housing when the shutter members are being closed, wherein a butt portion of at least one of the pair of shutter members has a concave portion with which a butt portion of the other shutter member is engaged.

With the above arrangement, in the disk cartridge according to the present invention, when the shutter mechanism is closed, the butt portion of one shutter member overlaps with the butt portion of the other shutter member. As a consequence, the labyrinth function can be demonstrated between the pair of the shutter members, whereby fluid can be made difficult to pass through the butt portions and dusts or the like can be made difficult to enter the cartridge housing.

In the disk cartridge according to the present invention, the butt portion of the one shutter member has a protrusion extended in the direction intersecting a thickness direction of the shutter member and the butt portion of the other shutter member has an oblong hole with which the protrusion is engaged.

With the above arrangement, the protrusion of one shutter member is entered into the oblong hole of the other shutter member and the labyrinth function is demonstrated by a combination of the protrusion and the oblong hole. Therefore, since the opening portions can be more reliably closed by the pair of the shutter members, it is possible to effectively prevent dusts or the like from being entered into the disk cartridge.

In the disk cartridge according to the present invention, the protrusion has a slope surface formed at least at its one surface intersecting its longitudinal direction and the oblong hole has a slope surface having approximately similar inclination at its surface opposing to the slope surface.

With the above arrangement, since the slope surface provided on the oblong hole is opposed to the slope surface provided at least on one surface of the protrusion, a space between the pair of the shutter members can be made constant and a more highly-dustproof property can be maintained.

In the disk cartridge according to the present invention, the length of the longitudinal direction of the oblong hole is longer than the length of the longitudinal direction of the protrusion and a pair of shutter members can be relatively moved in the longitudinal direction.

With the above arrangement, since the length of the protrusion is made longer than that of the oblong hole, dimensional errors and assembly errors of the pair of the shutter members can be absorbed by the protrusion and the oblong hole so that the dustproof property can be improved and dusts or the like can effectively be prevented from entering into the disk cartridge.

In the disk cartridge according to the present invention, the butt portions of the pair of shutter members include protrusions extended in the directions intersecting the thickness direction and an oblong hole with which a protrusion formed on the butt portion of the other shutter member is engaged.

With the above arrangement, since the protrusion and the oblong hole are respectively formed on the butt portions of the pair of the shutter members and the oblong hole and the protrusion are engaged with the oblong hole and the protrusion of the other shutter member, respectively, the space between the pair of shutter members can be made constant and there can be provided the highly-dustproof disk cartridge.

In the disk cartridge according to the present invention, the respective shutter portions of the pair of shutter members are shaped as substantially triangles and long sides of the triangles are butted so as to form the whole of the shutter portion as substantially a rectangle.

With the above arrangement, the relatively large opening portion formed of the wide and long recess can be opened and closed reliably by a combination of the two shutter portions shaped as substantially triangles.

In the disk cartridge according to the present invention, one shutter member of the pair of shutter members is rotatably supported to the disk cartridge, the other shutter member is rotatably supported to one shutter member and includes a belt-like portion the tip end portion of which is protruded to the outside of the cartridge housing and the pair of shutter members can be opened and closed with application of external force to the belt-like portion.

With the above arrangement, the pair of the shutter members can be rotated with application of external force to the tip end portion of the belt-like portion such that they can come close to each other or come away from each other. Accordingly, the opening portion can be opened and closed reliably and smoothly by moving the pair of shutter members close to each other or distant from each other.

BRIEF DESCRIPTION OF THE DRAWINGS

FIGS. 24A and 24B are diagrams to which reference will be made in explaining the state obtained after the shutter has been locked by the shutter mechanism shown in FIG. 20, wherein FIG. 24A shows the state in which the shutter is placed in the over stroke state and FIG. 24B shows the state in which the shutter is placed in the free state;

FIGS. 28A and 28B are partly cross-sectional views to which reference will be made in explaining a difference between the shutter mechanism of the disk cartridge according to the present invention and the shutter mechanism according to the related art, wherein FIG. 28A is a partly cross-sectional view to which reference will be made in explaining a dustproof function of the shutter mechanism according to the present invention and FIG. 28B is a partly cross-sectional view to which reference will be made in explaining a dustproof function of the shutter mechanism according to the related art;

FIGS. 37A and 37B show a main portion of the shutter mechanism shown in FIG. 36 in an enlarged-scale, wherein FIG. 37A is a plan view and FIG. 37B is a bottom view;

FIGS. 38A and 38B are views to which reference will be made in explaining a positional relationship obtained when main portions of the shutter mechanism shown in FIG. 37 are assembled, wherein FIG. 38A is a plan view illustrating the state in which longitudinal directions of an L-like shaft portion and an engagement hole are matched with each other and FIG. 38B is a cross-sectional view taken along the line Y—Y in FIG. 38A; and FIGS. 39A and 39B are cross-sectional views taken along the line Z—Z of the shutter mechanism shown in FIG. 36, wherein FIG. 39A is a cross-sectional view to which reference will be made in explaining the state obtained before the shutter members are butted with each other and FIG. 39B is a cross-sectional view to which reference will be made in explaining the state obtained after the shutter members had been butted with each other.

DESCRIPTION OF THE PREFERRED EMBODIMENTS

A disk cartridge according to the embodiments of the present invention will be described below with reference to the accompanying drawings.

Figure 5:
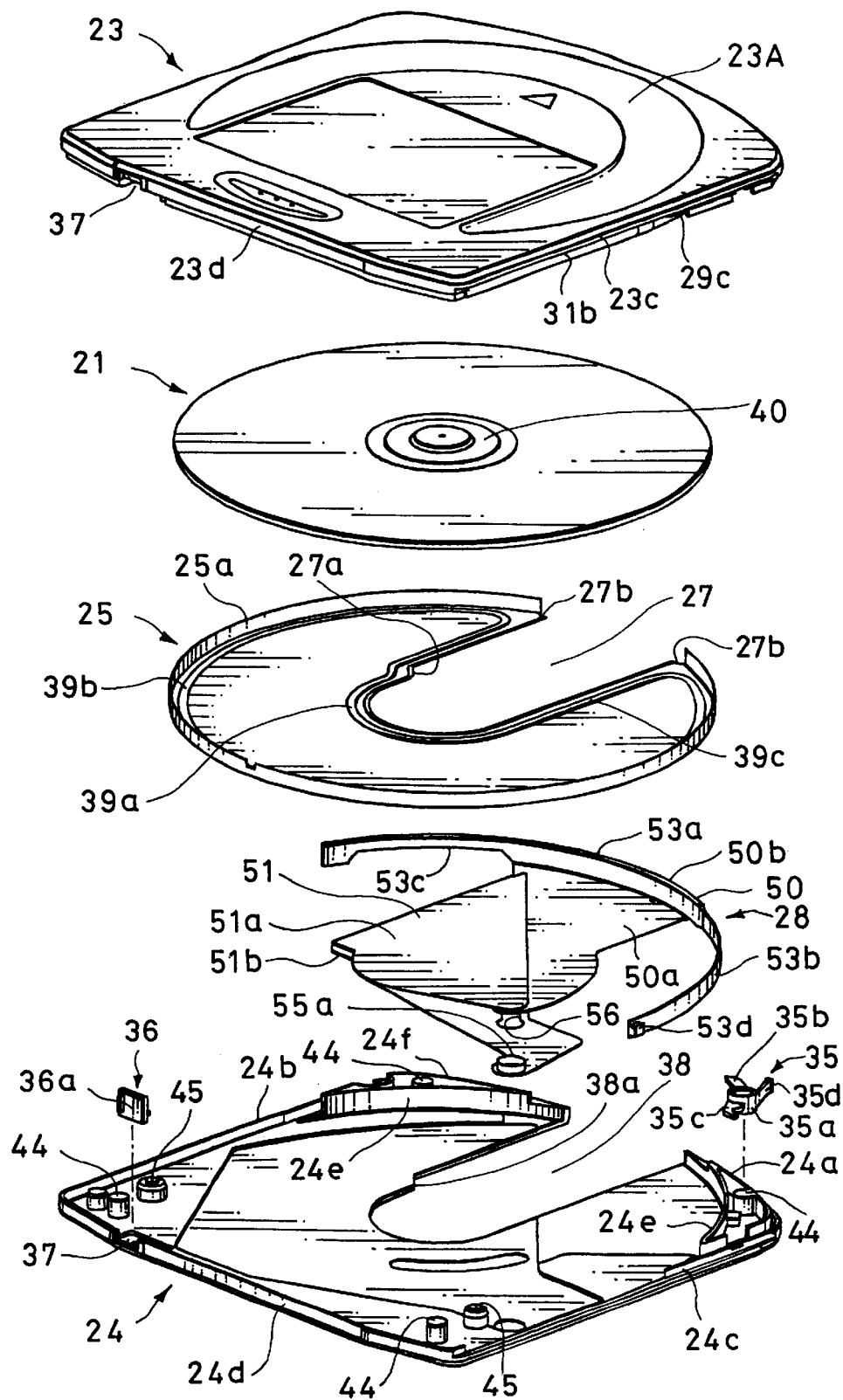
FIG. 5 is an exploded perspective view illustrating a disk cartridge according to a first embodiment of the present invention from its upper surface side.
Figure 6:
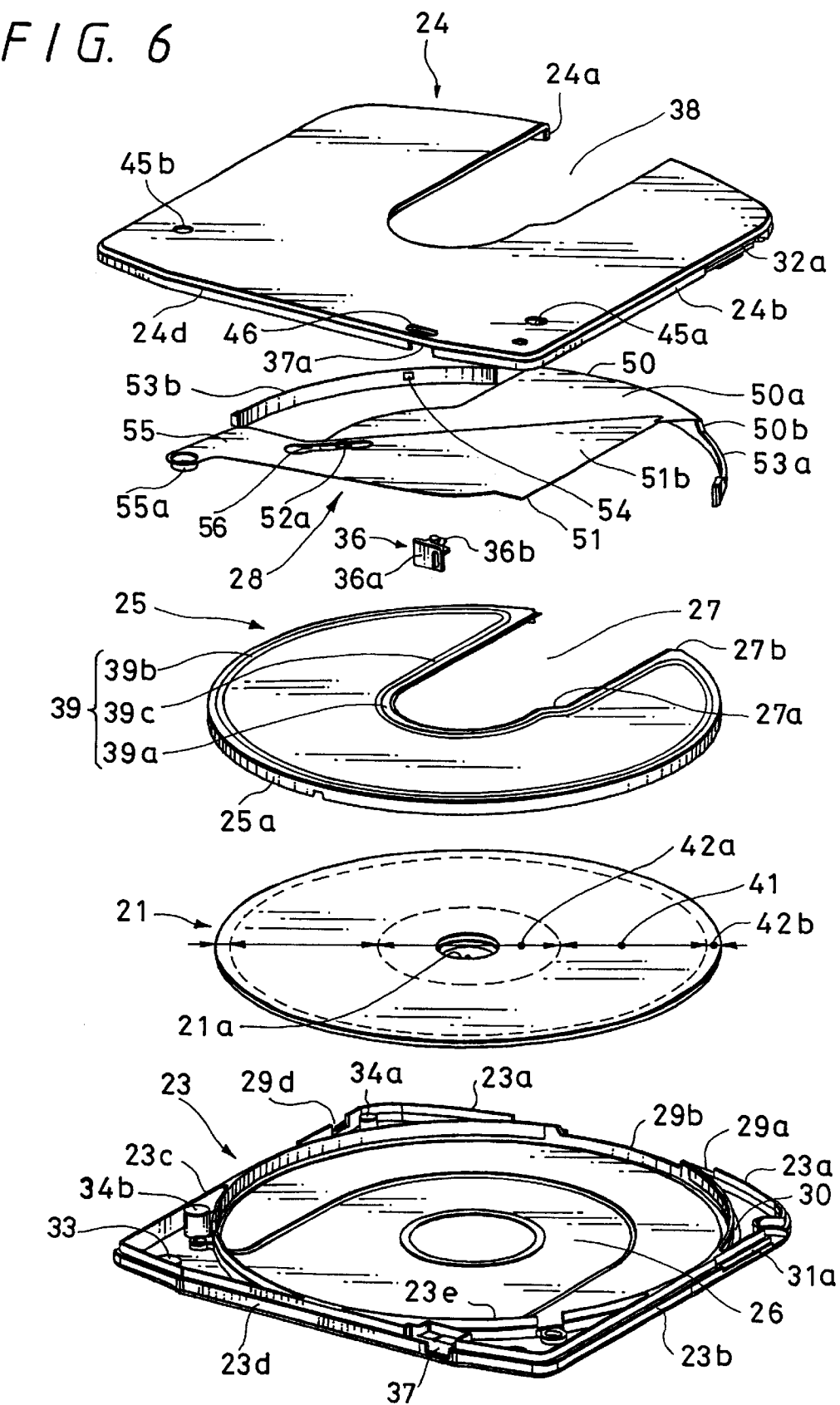
FIG. 6 is an exploded perspective view illustrating the disk cartridge shown in FIG. 5 from its lower surface side.
Figure 7:
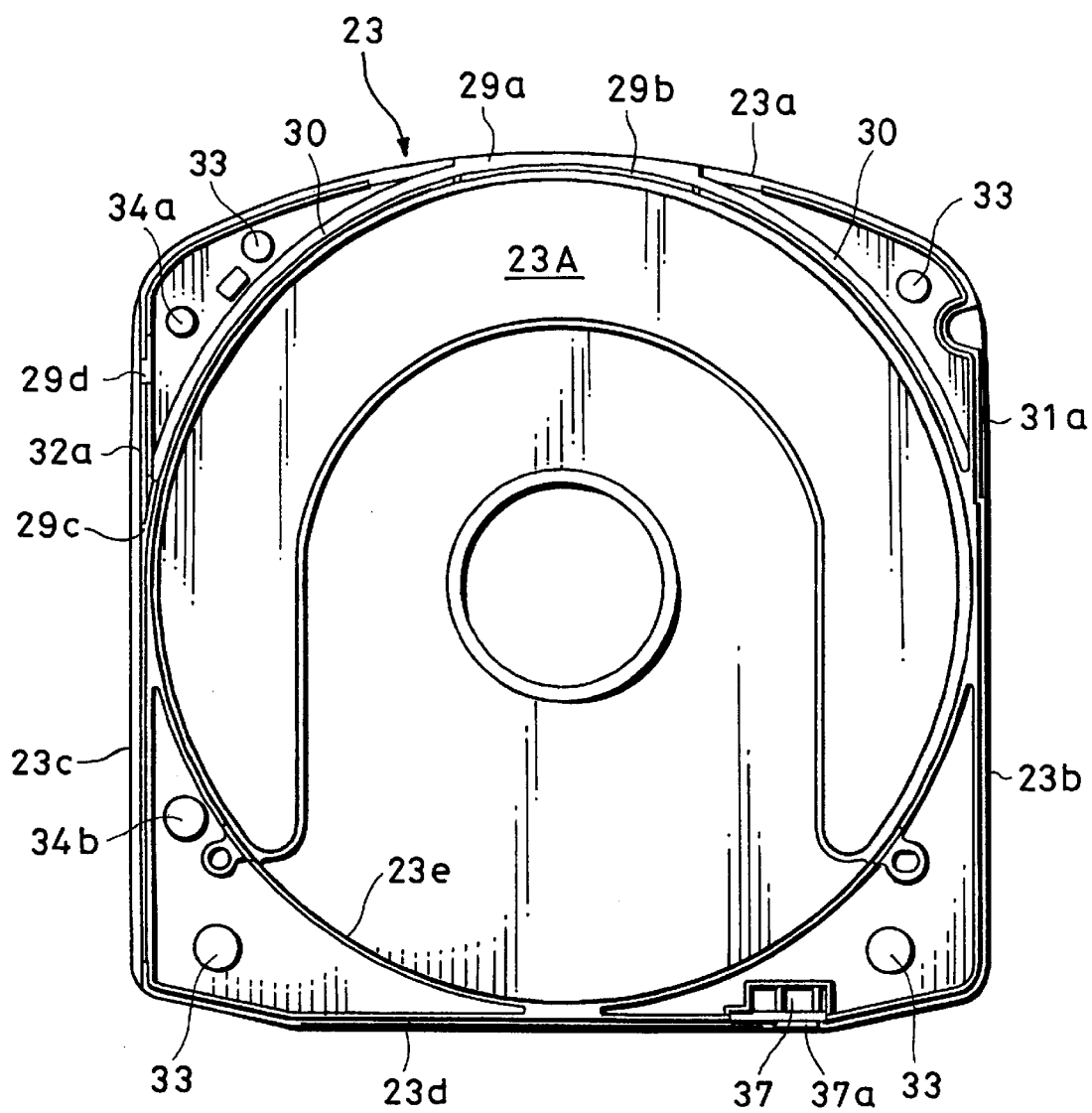
FIG. 7 is a bottom view of an upper shell of the disk cartridge shown in FIG. 5.
Figure 8:
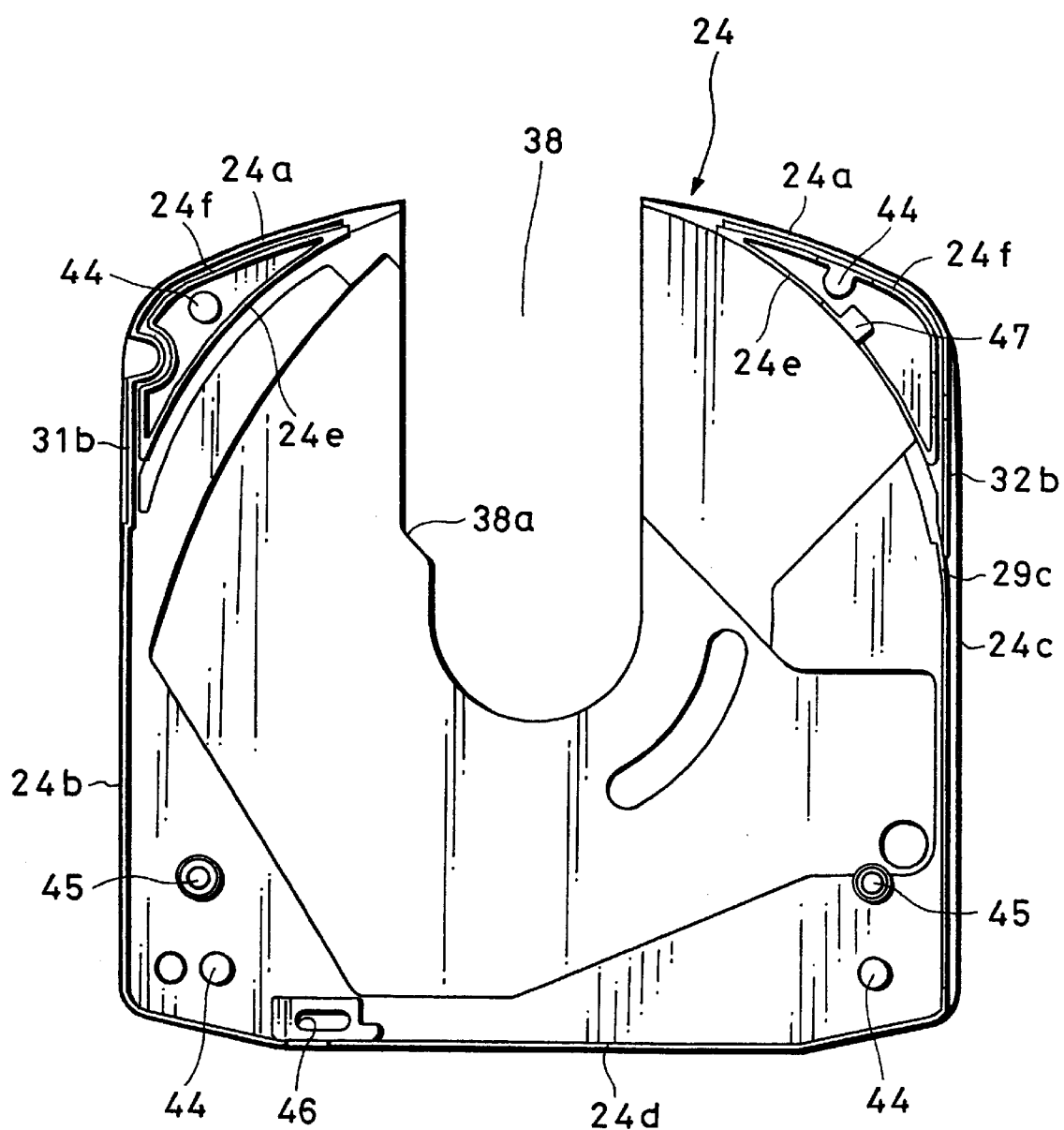
FIG. 8 is a plan view of the lower shell of the disk cartridge shown in FIG. 5.
Figure 9:
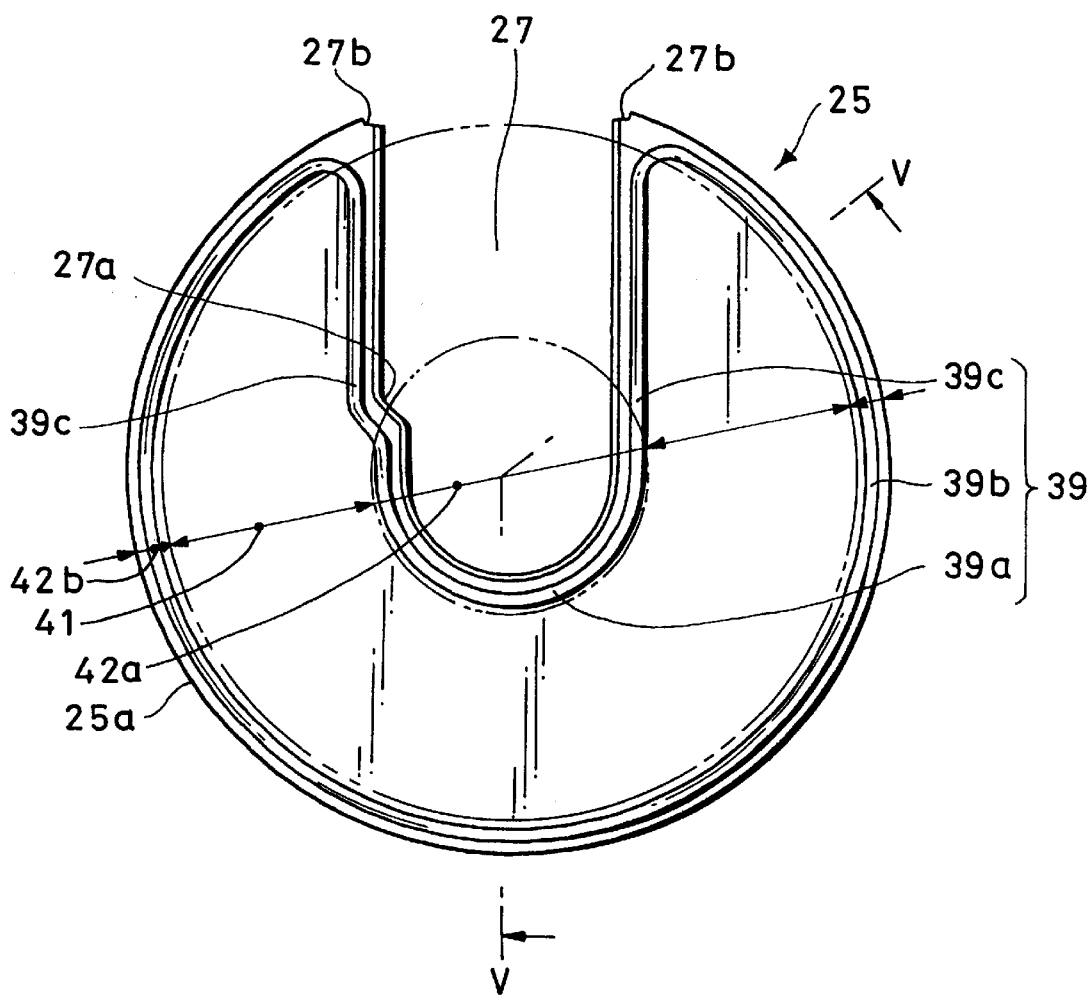
FIG. 9 is a plan view of a middle shell of the disk cartridge shown in FIG. 5.
Figure 10:
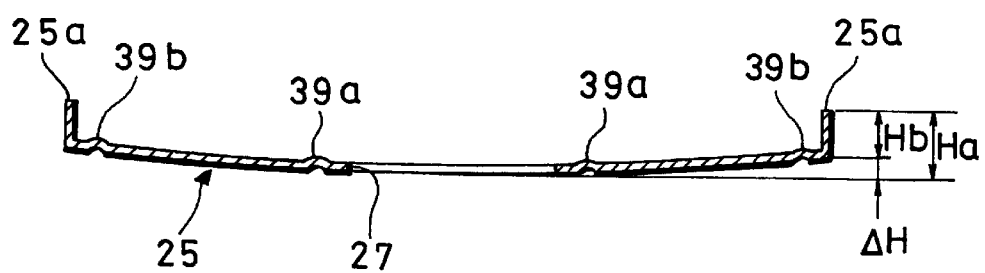
FIG. 10 is a longitudinal cross-sectional view of the center portion of the middle shell shown in FIG. 9.
Figure 11:
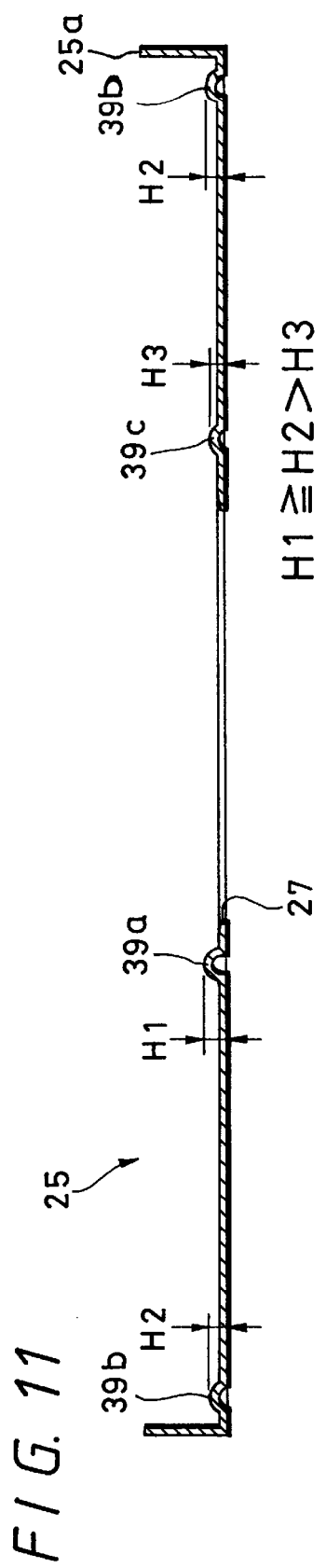
FIG. 11 is a diagram to which reference will be made in explaining a relationship among the rib portions of the middle shell shown in FIG. 9.
Figure 15A:
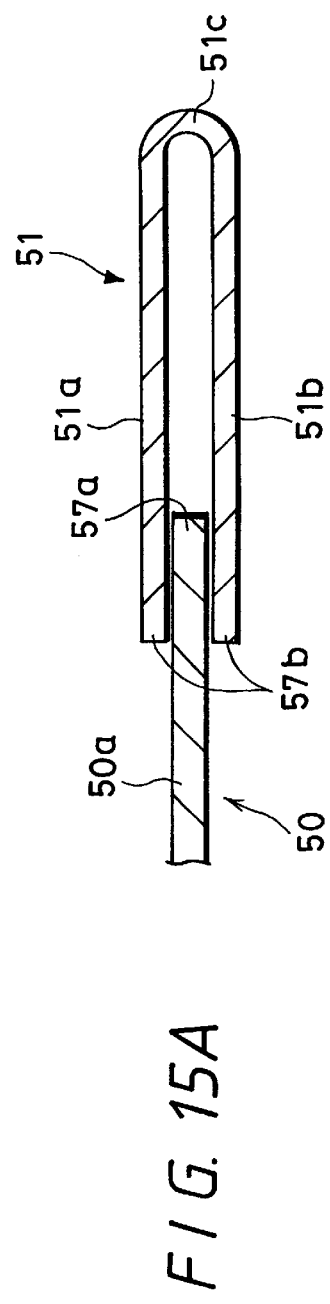
FIG. 15A is an enlarged cross-sectional view taken along the line W—W of the shutter mechanism shown in FIG. 14.
Figure 15B:
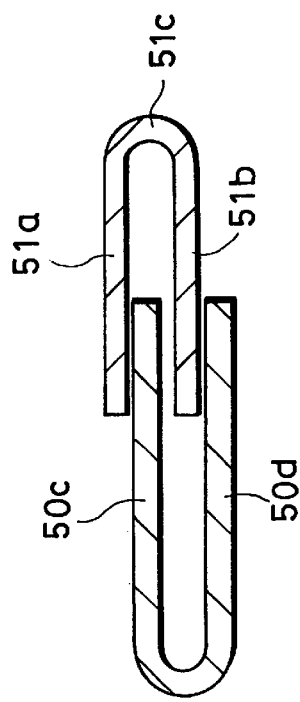
FIG. 15B is an enlarged cross-sectional view taken along the line W—W of the shutter mechanism shown in FIG. 14 according to another embodiment of the present invention.
Figure 12:
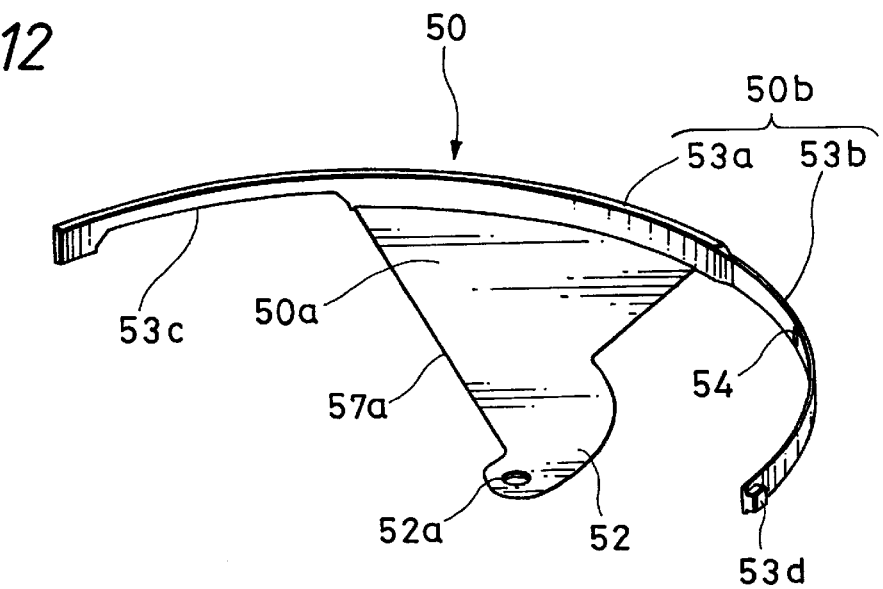
FIG. 12 is a perspective view illustrating a first shutter member of a shutter mechanism of the disk cartridge shown in FIG. 5 according to the first embodiment of the present invention.
Figure 14:
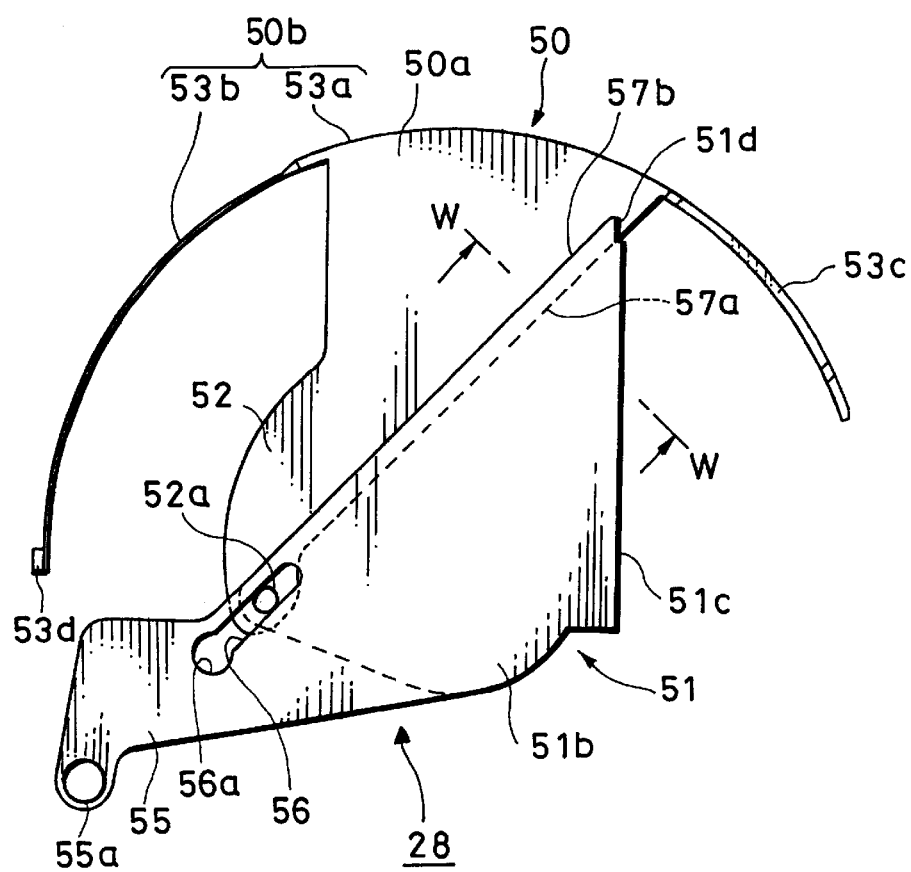
FIG. 14 is a bottom view illustrating the shutter mechanism of the disk cartridge shown in FIG. 5 according to the first embodiment of the present invention while the shutter mechanism is being closed.
Figure 13:
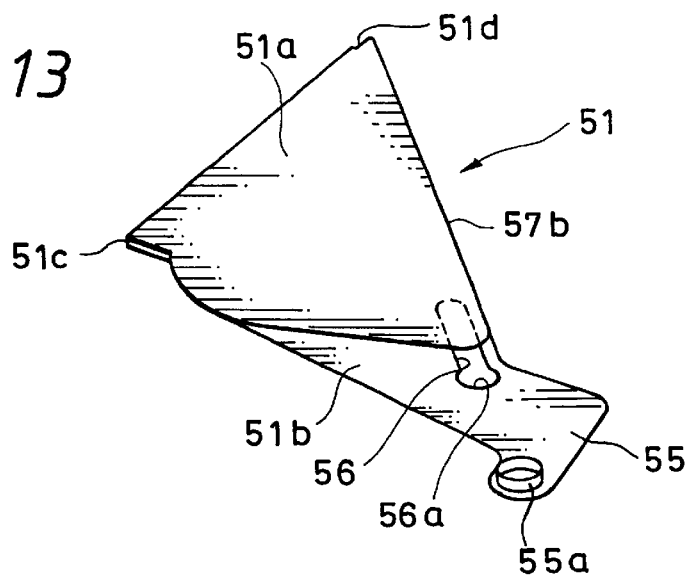
FIG. 13 is a perspective view illustrating a second shutter member of the shutter mechanism of the disk cartridge shown in FIG. 5 according to the first embodiment of the present invention.
Figure 16:
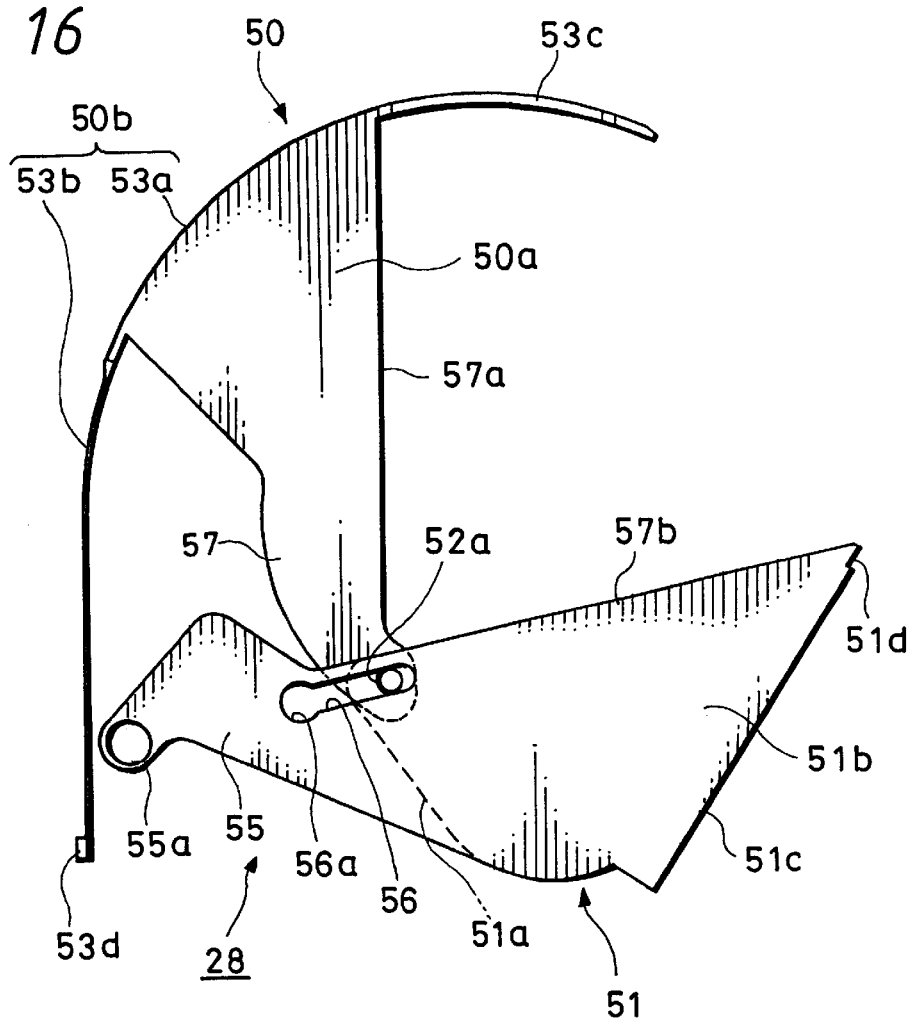
FIG. 16 is a bottom view illustrating the shutter mechanism of the disk cartridge shown in FIG. 5 according to the first embodiment of the present invention while the shutter mechanism is being opened.

FIG. 5 to FIGS. 39A, 39B are diagrams showing the disk cartridge according to the embodiments of the present invention. FIG. 5 is an exploded perspective view illustrating a disk cartridge according to a first embodiment of the present invention from the upper surface side. FIG. 6 is an exploded perspective view illustrating the disk cartridge according to the first embodiment of the present invention from the lower surface side. FIG. 7 is a bottom view of an upper shell. FIG. 8 is a plan view of a lower shell. FIG. 9 is a plan view of a middle shell. FIG. 10 is a longitudinal cross-sectional view of a center portion of the middle shell. FIG. 11 is an enlarged cross-sectional view taken along the line V—V in FIG. 9. FIG. 12 is a perspective view of a first shutter member. FIG. 13 is a perspective view of a second shutter member. FIG. 14 is a plan view illustrating the state in which the shutter mechanism is being closed under the condition that the first and second shutter members are partially assembled. FIGS. 15A and 15B are enlarged cross-sectional views taken along the line W—W in FIG. 14, respectively. FIG. 16 is a plan view similarly showing the state in which the shutter mechanism is being opened.

Figure 17:
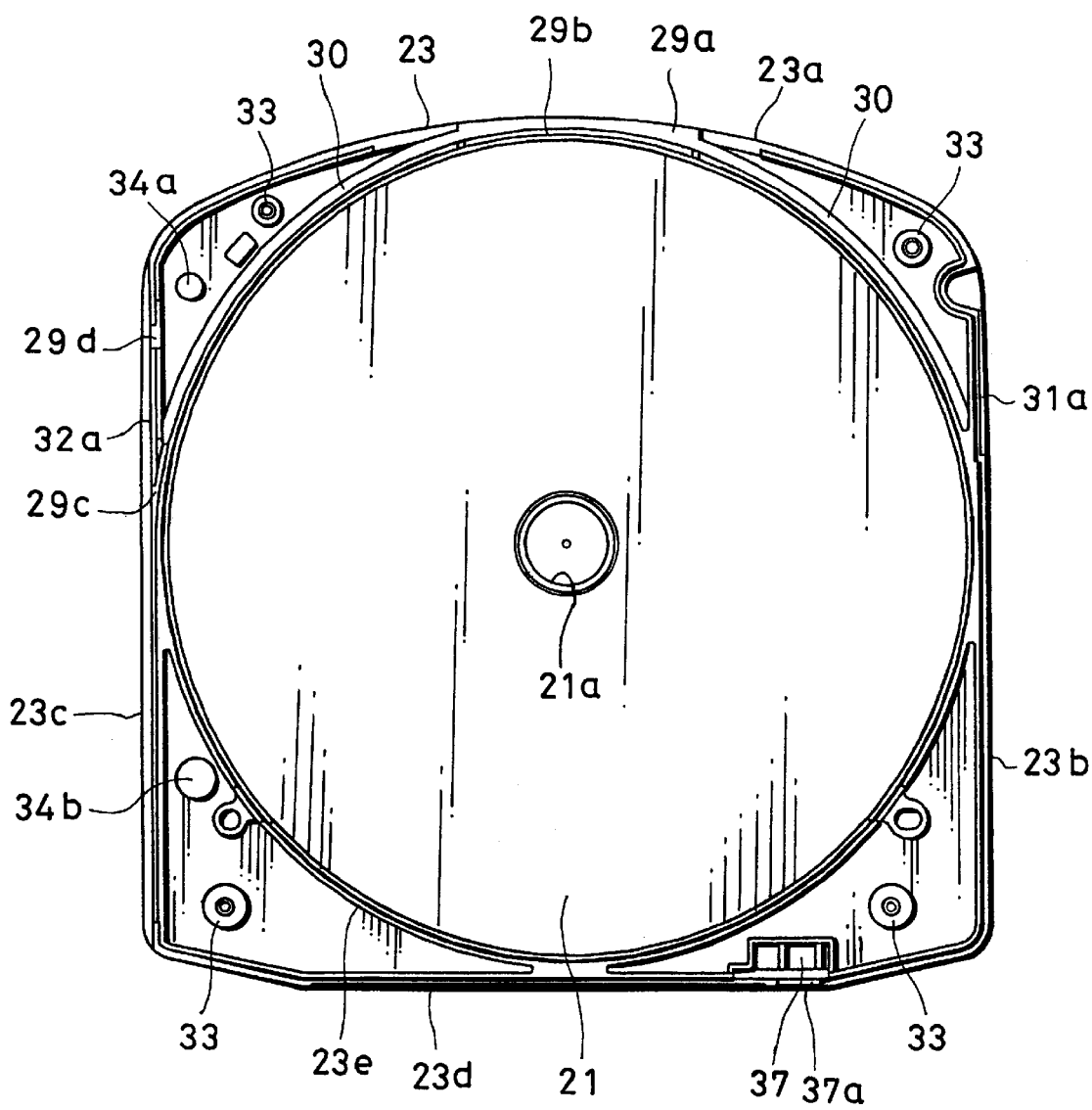
FIG. 17 is a plan view illustrating the state in which the optical disk is assembled into the upper shell shown in FIG. 6.
Figure 18:
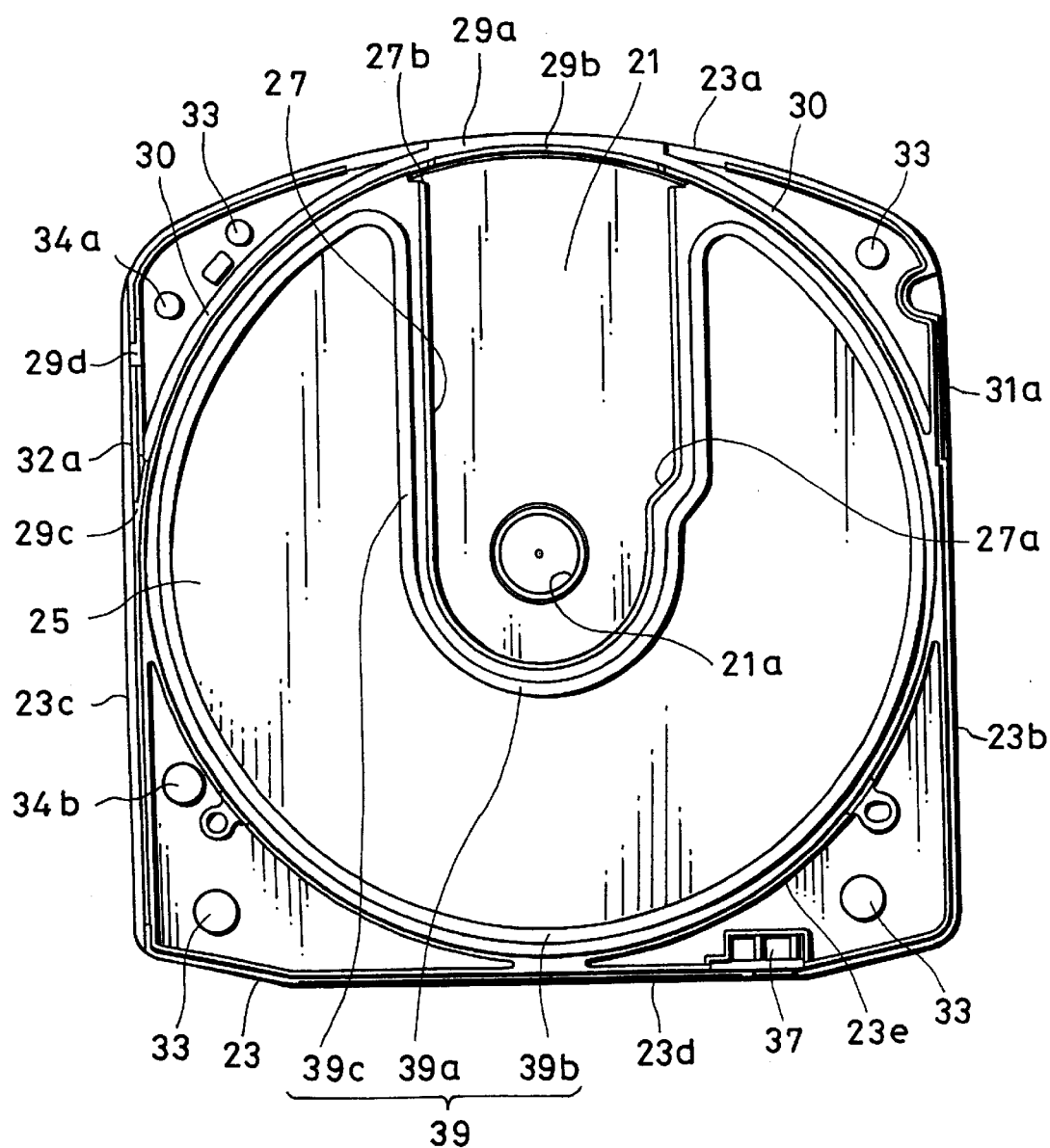
FIG. 18 is a plan view illustrating the state in which the middle shell is assembled into the disk cartridge shown in FIG. 17.
Figure 19:
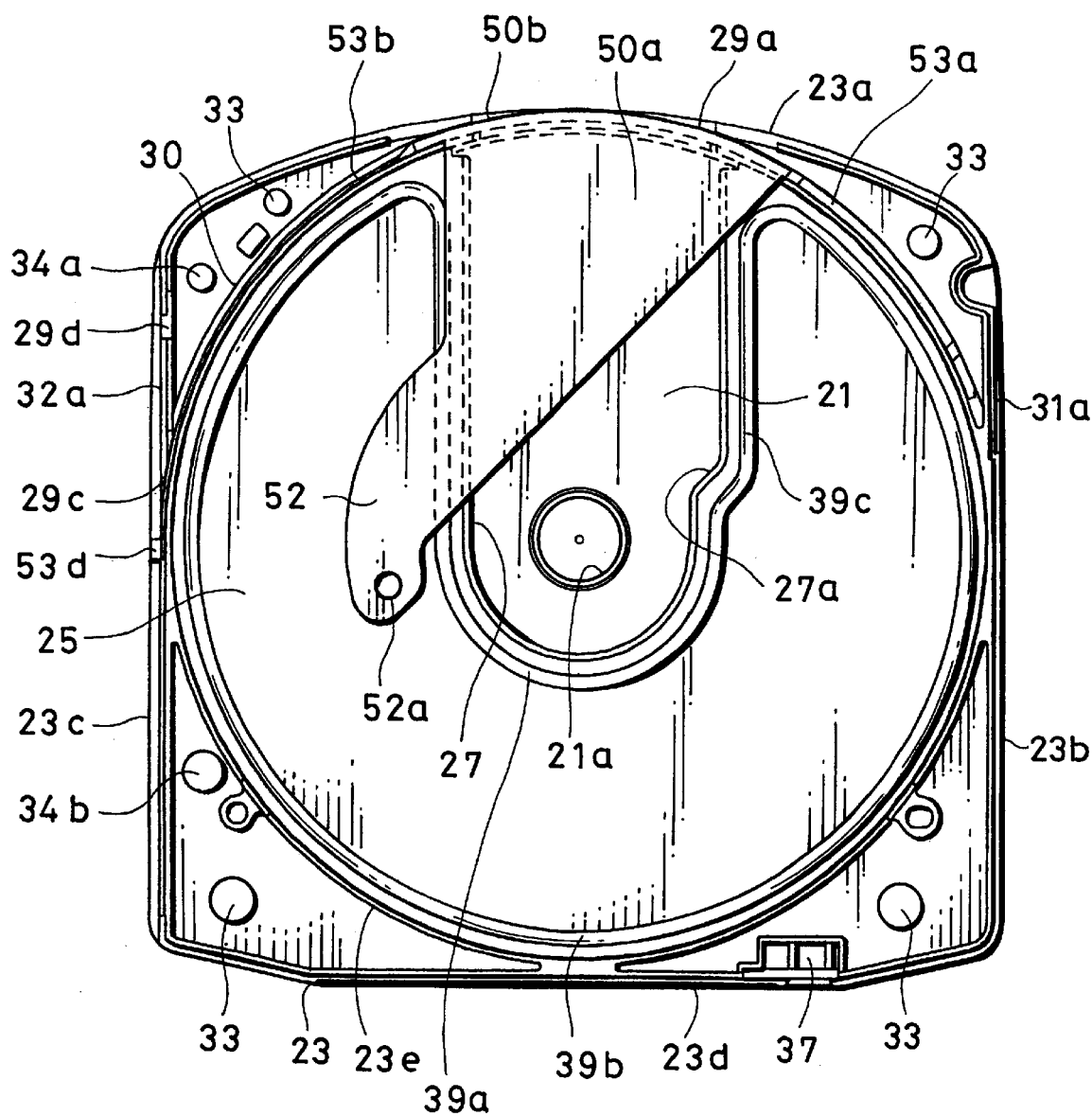
FIG. 19 is a plan view illustrating the state in which the first shutter member is assembled into the disk cartridge shown in FIG. 18.
Figure 20:
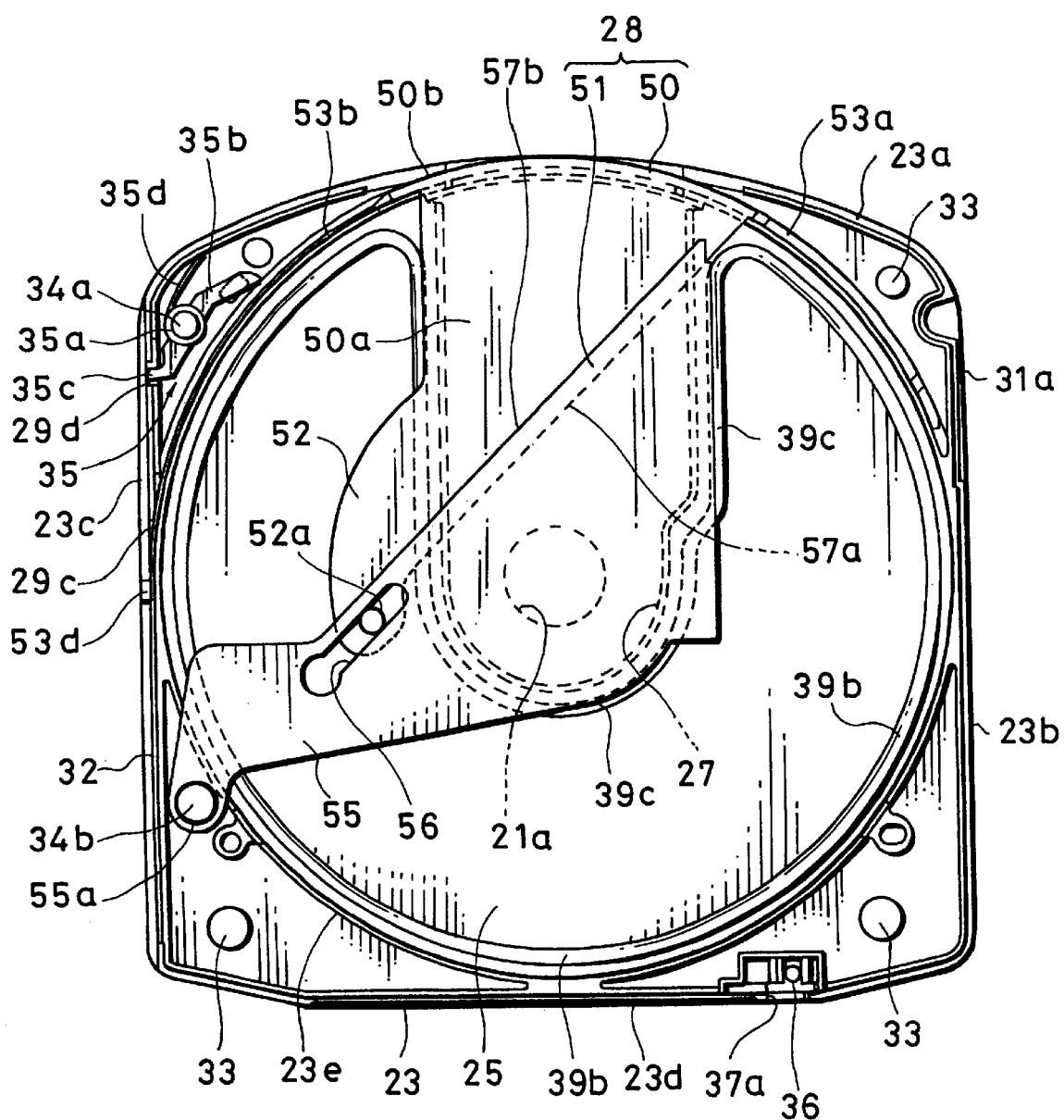
FIG. 20 is a plan view illustrating the state in which the second shutter member is assembled into the disk cartridge shown in FIG. 19 while the shutter mechanism is being closed.
Figure 21:
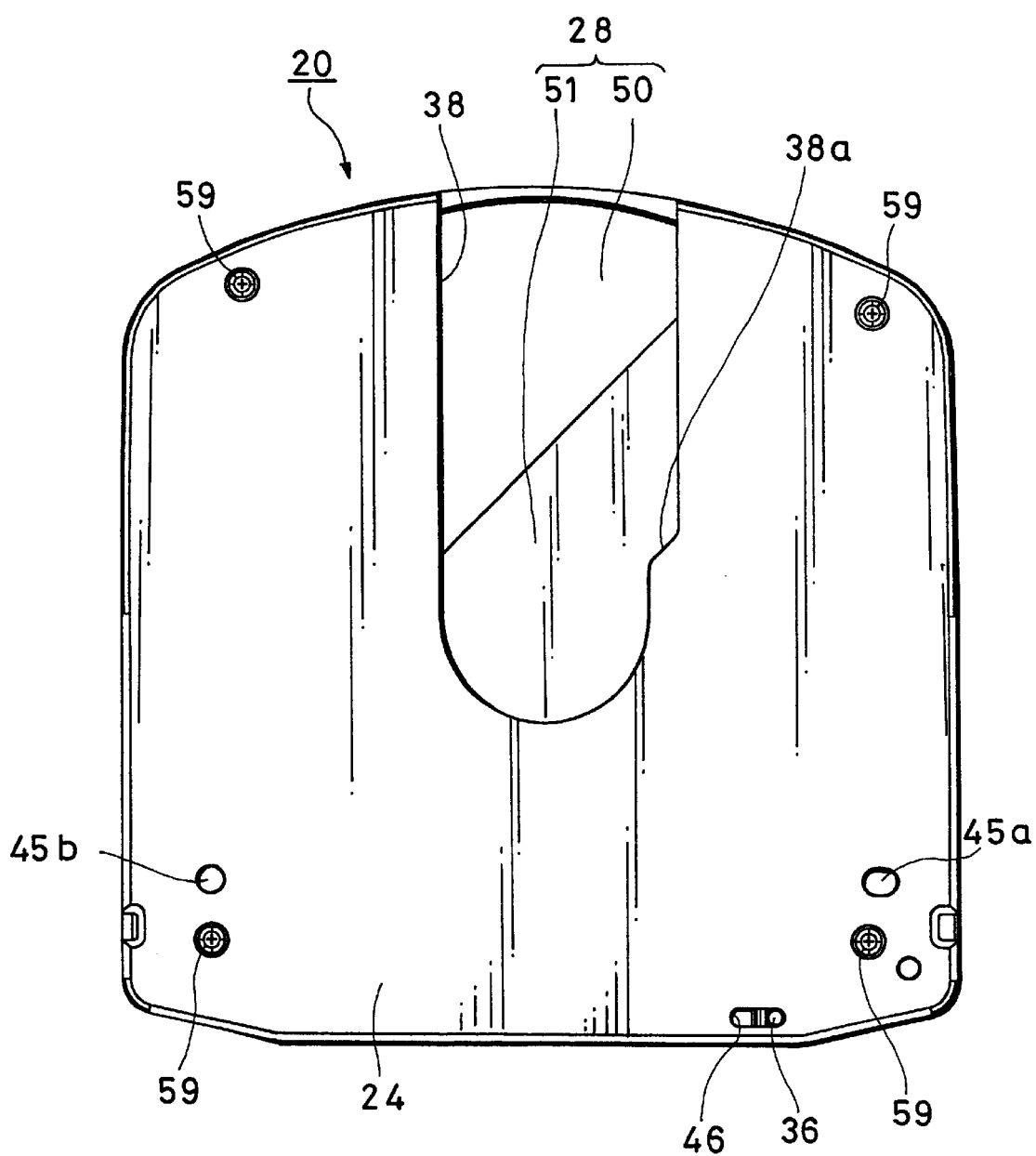
FIG. 21 is a plan view illustrating the state in which the lower shell is assembled into the disk cartridge shown in FIG. 20.
Figure 22:
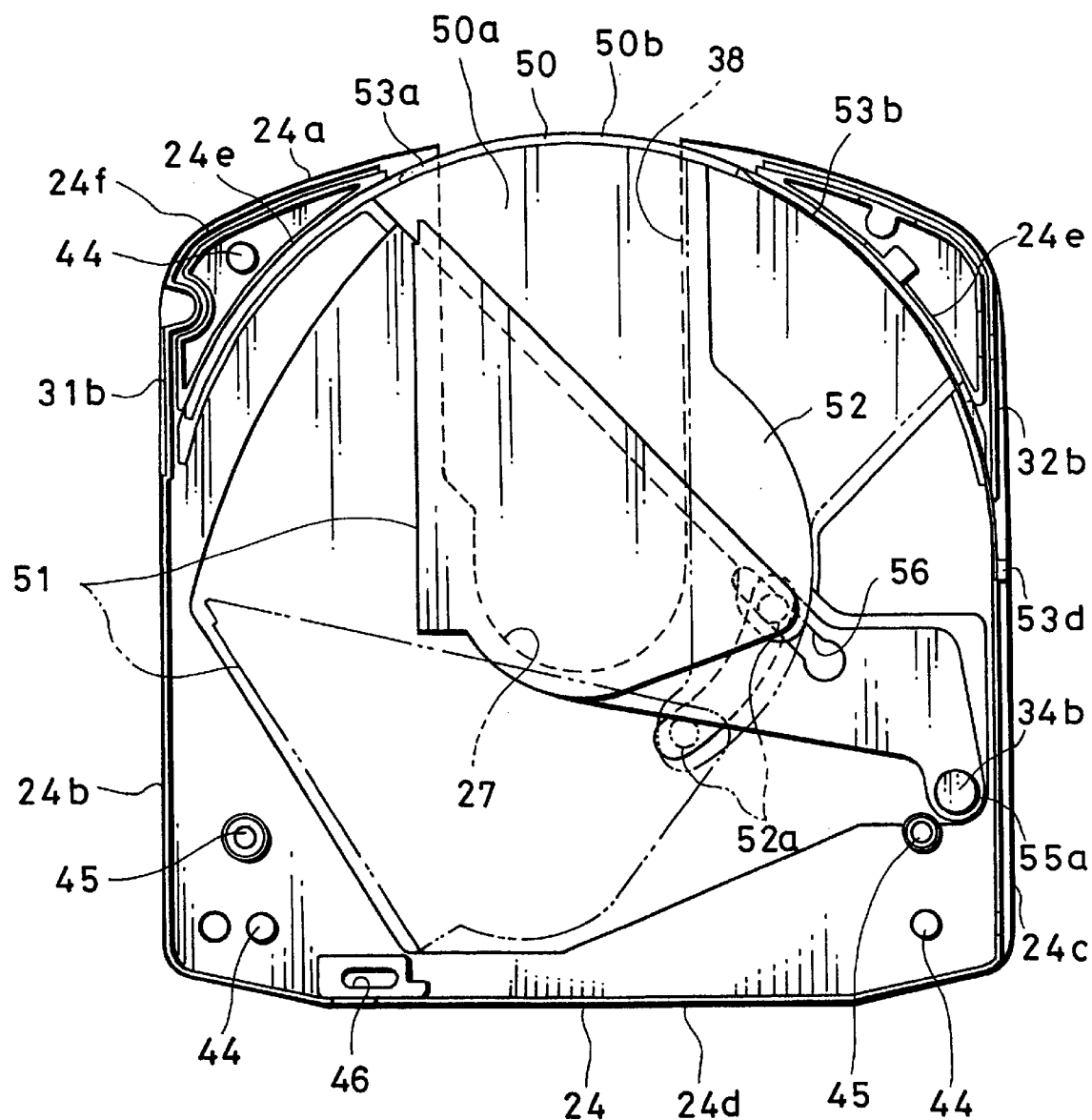
FIG. 22 is a perspective view illustrating the state in which the first and second shutter members are assembled into the lower shell shown in FIG. 8.
Figure 23:
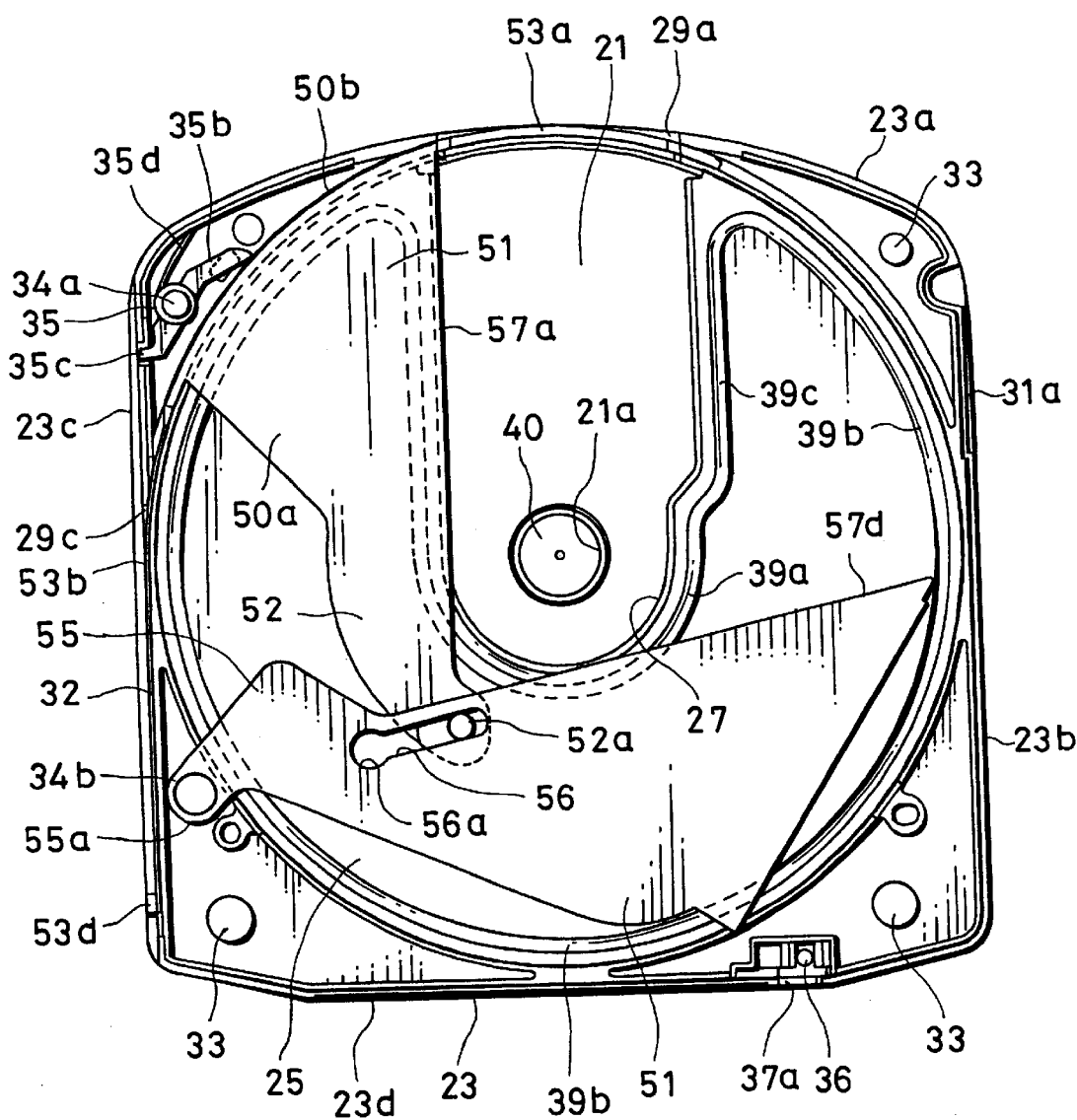
FIG. 23 is a plan view illustrating the state in which the shutter mechanism shown in FIG. 20 is opened.
Figure 24A:
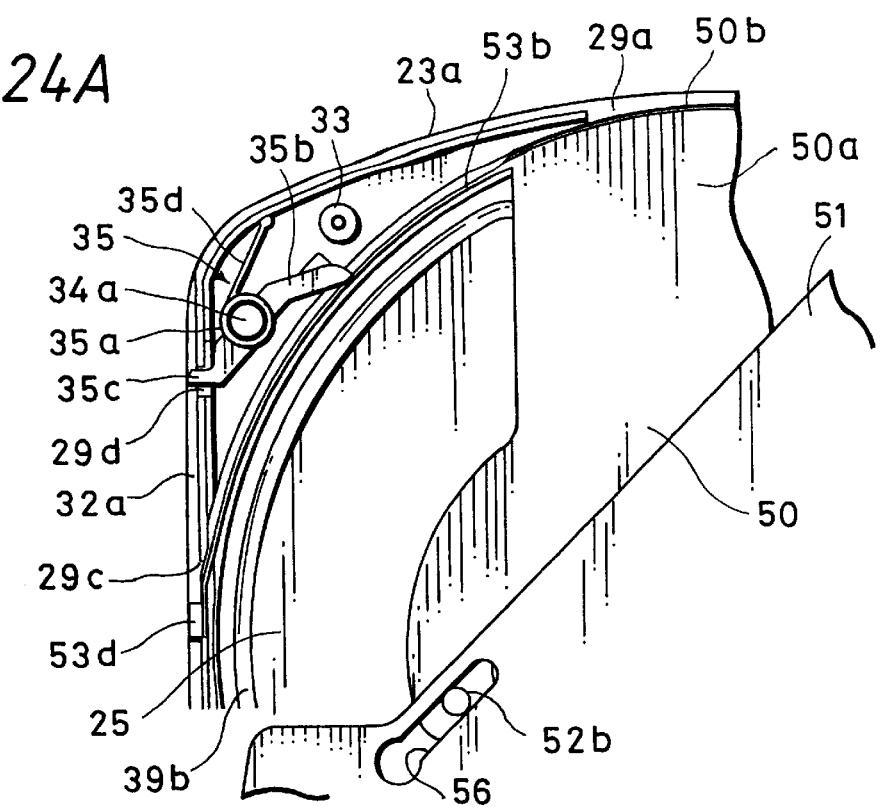
Figure 24B:
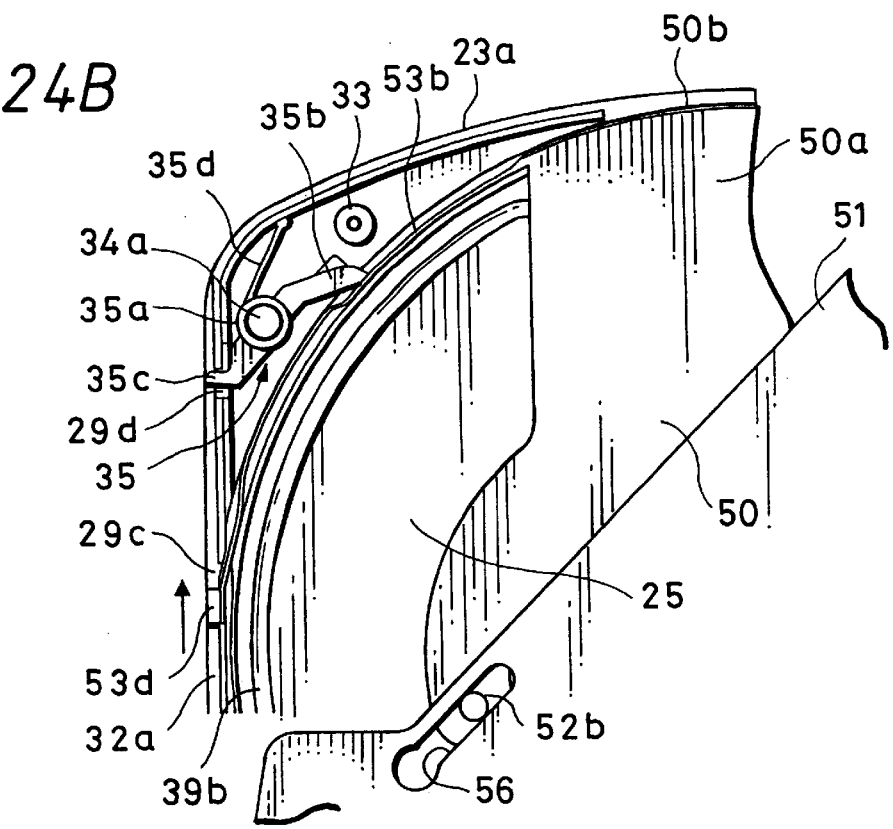
Figure 25:
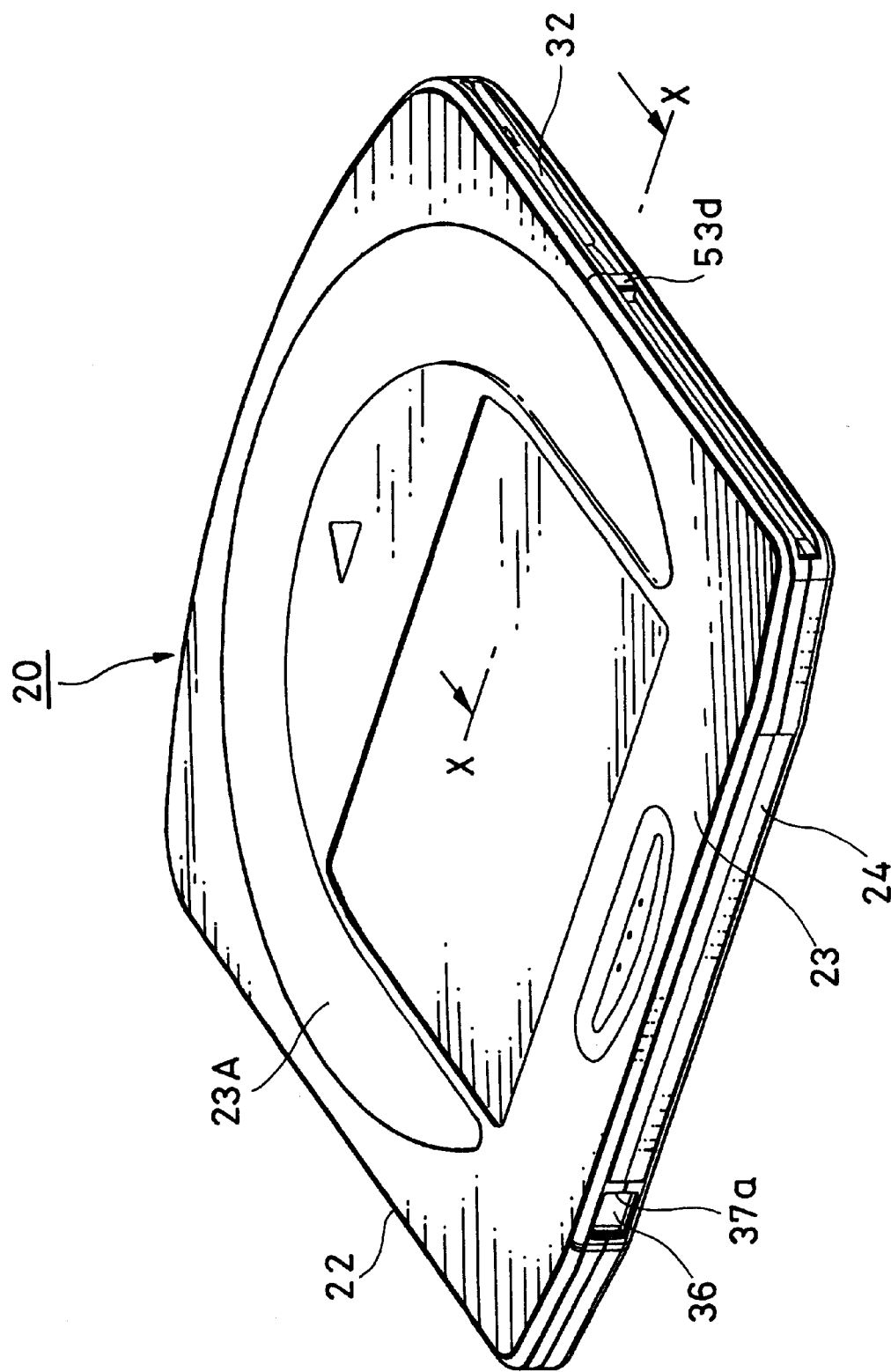
FIG. 25 is a perspective view illustrating the state obtained after the disk cartridge shown in FIG. 5 has been assembled.

FIG. 17 is a bottom view illustrating the state in which an optical disk is accommodated within the upper shell. FIG. 18 is a bottom view illustrating the state in which the middle shell is assembled on the state shown in FIG. 17. FIG. 19 is a bottom view illustrating the state in which the first shutter member is assembled on the state shown in FIG. 18. FIG. 20 is a bottom view illustrating the state in which the second shutter member is assembled on the state shown in FIG. 19. FIG. 21 is a bottom view illustrating the state in which the lower shell is assembled on the state shown in FIG. 20. FIG. 22 is a plan view illustrating the state in which the first and second shutter members are assembled on the lower shell. FIG. 23 is a bottom view illustrating the state in which the shutter mechanism shown in FIG. 20 is being opened. FIGS. 24A and 24B are diagrams to which reference will be made in explaining a relationship between the first shutter member and a lock mechanism, respectively. FIG. 25 is a perspective view showing an arrangement of an outward appearance of a disk cartridge according to a first embodiment of the present invention.

Figure 26:
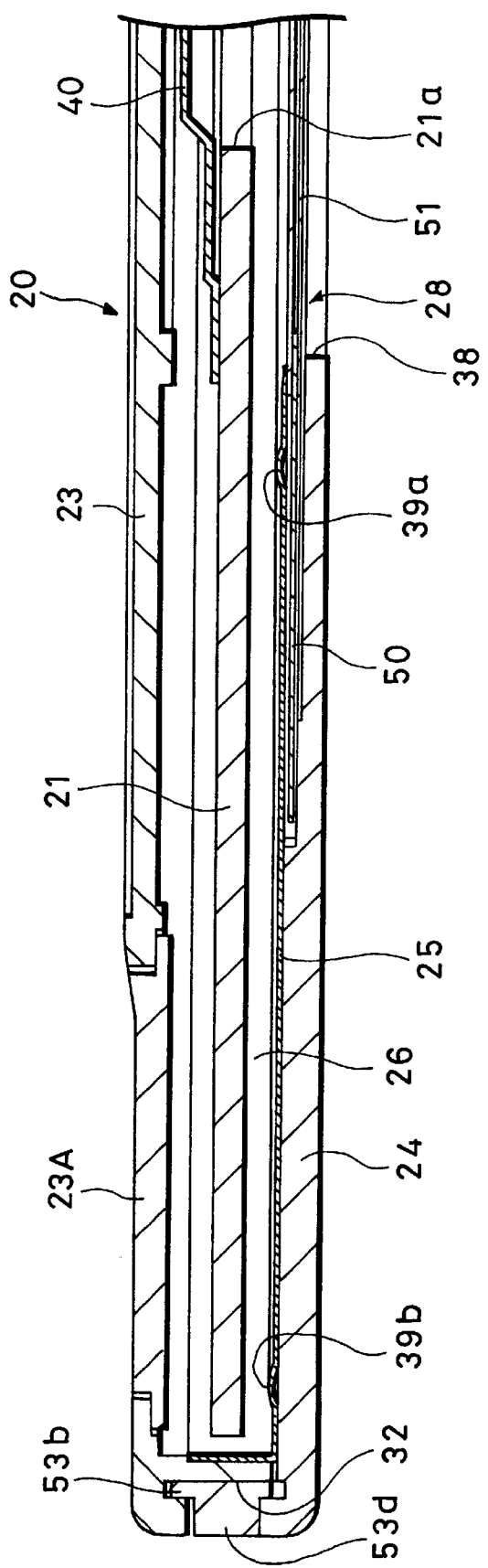
FIG. 26 is an enlarged cross-sectional view taken along the line X—X of the disk cartridge shown in FIG. 25.
Figure 27:
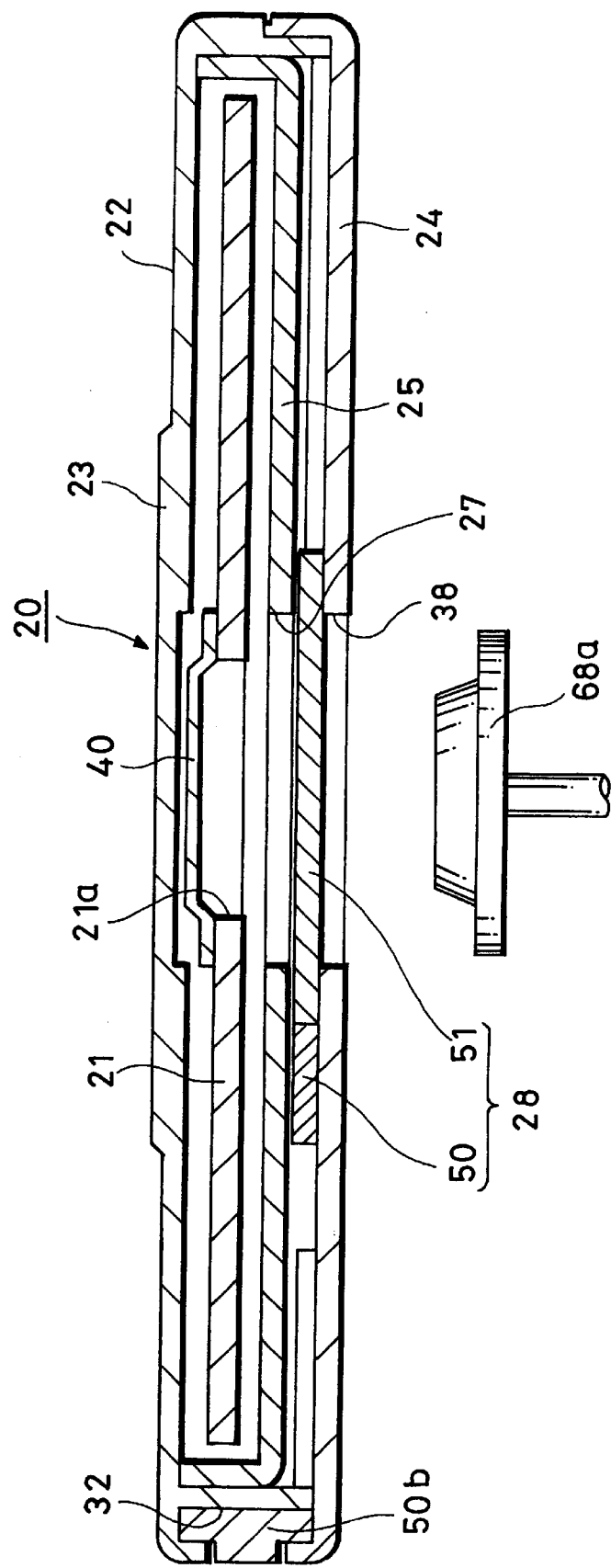
FIG. 27 is a longitudinal cross-sectional view of a center portion to which reference will be made in explaining the arrangement of the disk cartridge shown in FIG. 25.
Figure 28A:
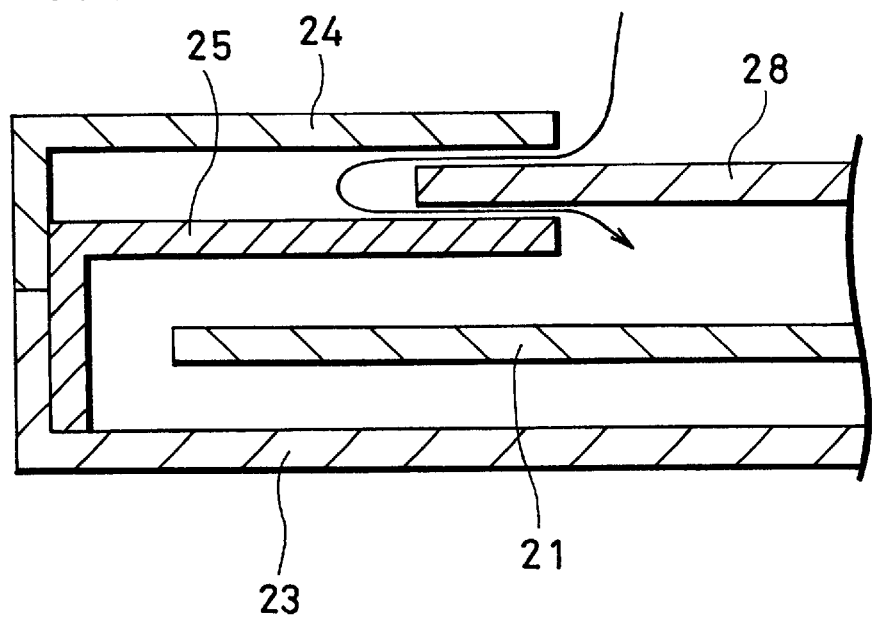
Figure 28B:
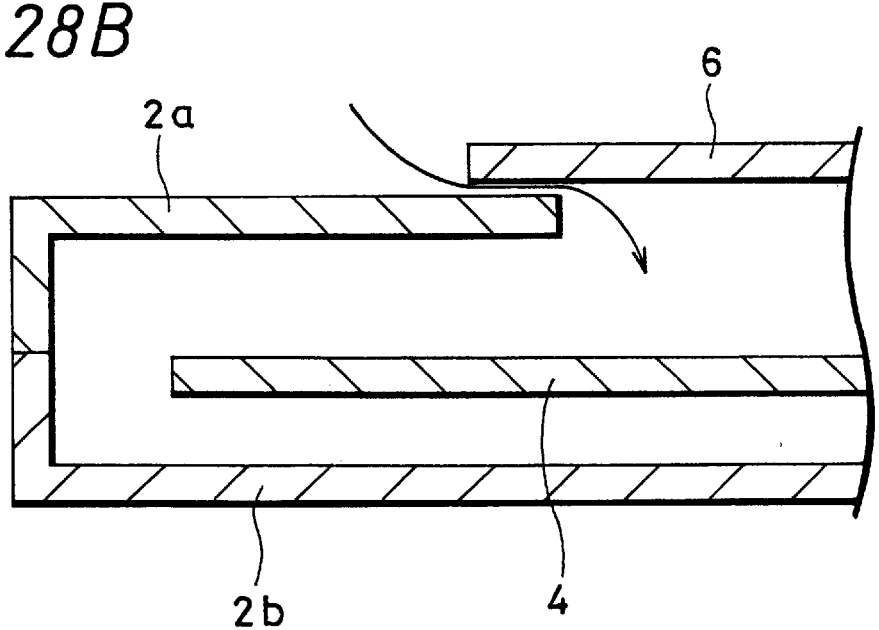
Figure 29:
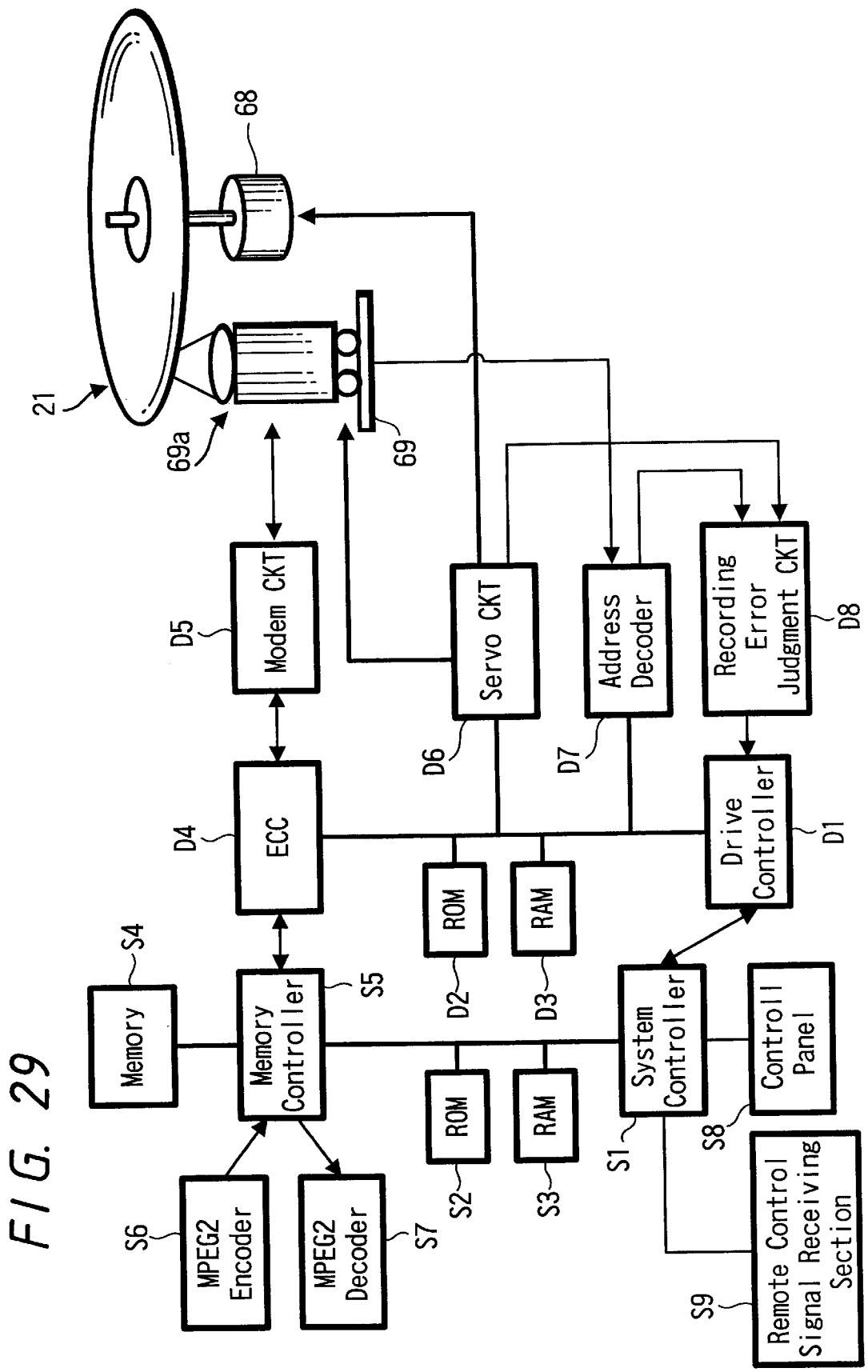
FIG. 29 is a block diagram showing a circuit arrangement of a disk recording and reproducing apparatus which uses the inventive disk cartridge according to an embodiment of the present invention.
Figure 30:
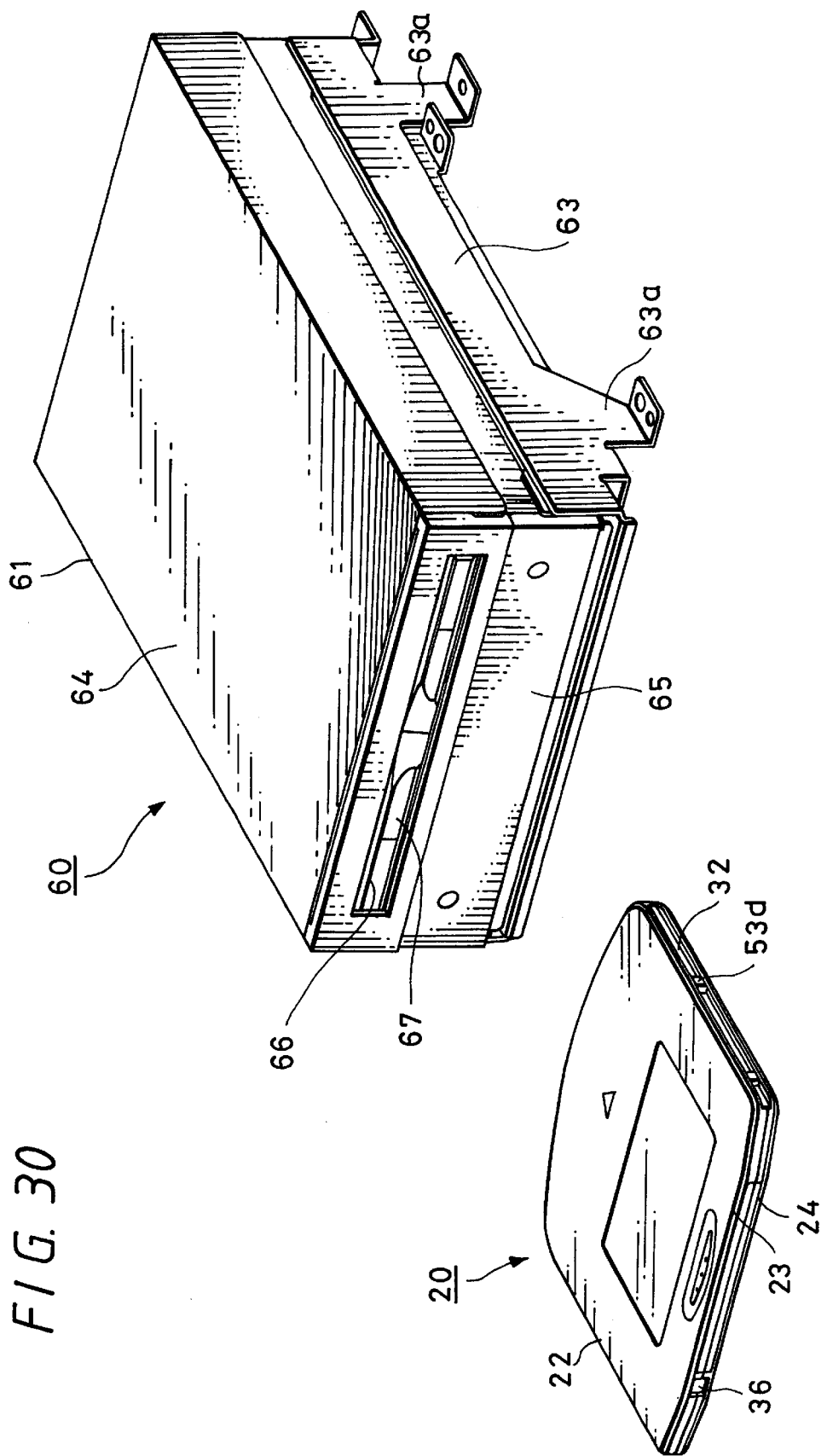
FIG. 30 is a perspective view illustrating the state obtained before the disk cartridge shown in FIG. 5 is inserted into the disk recording and reproducing apparatus which uses the disk cartridge according to the present invention.
Figure 31:
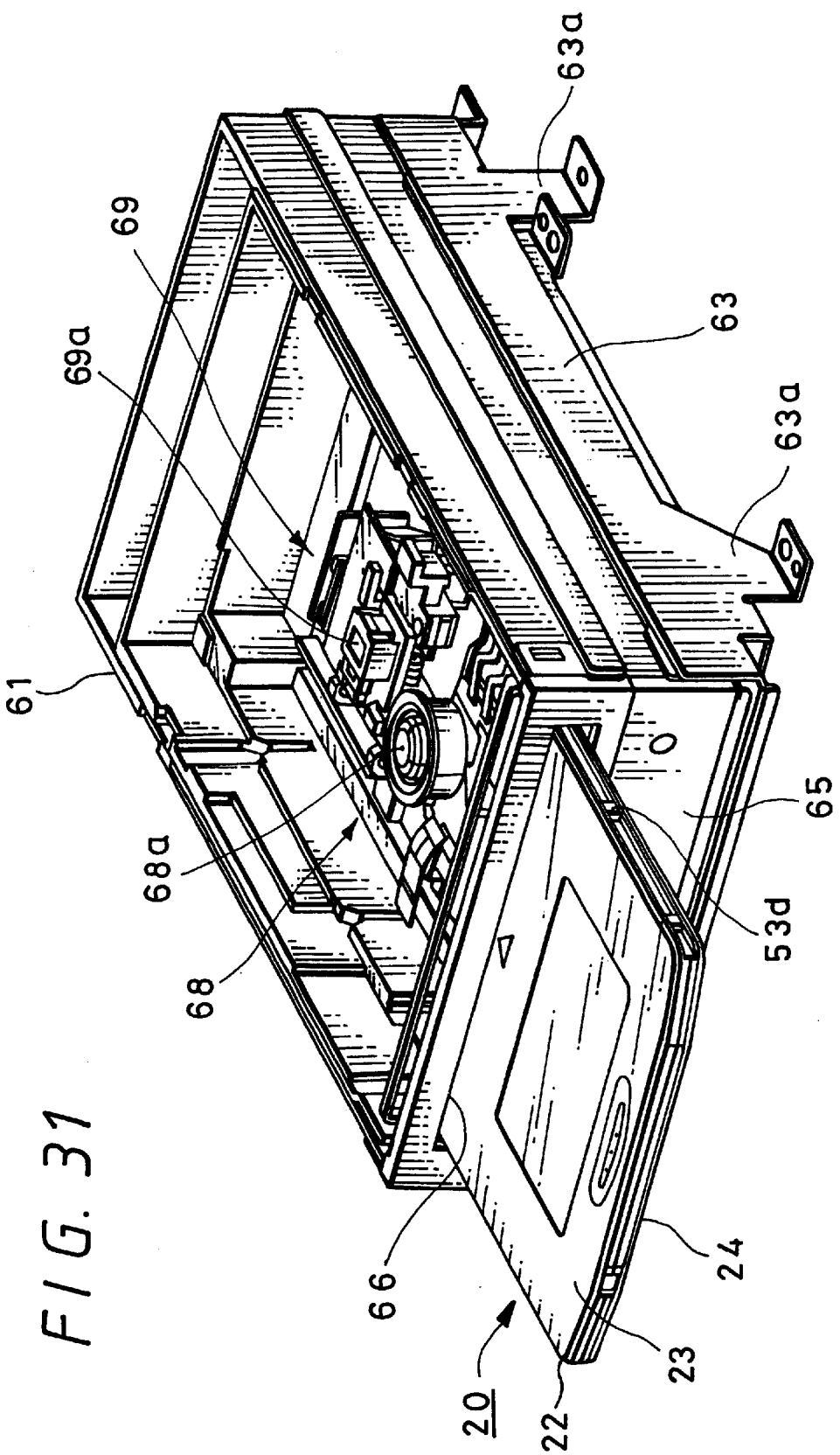
FIG. 31 is a perspective view illustrating the state obtained when the disk cartridge shown in FIG. 5 is being inserted into the disk recording and reproducing apparatus which uses the disk cartridge according to the present invention.
Figure 32:
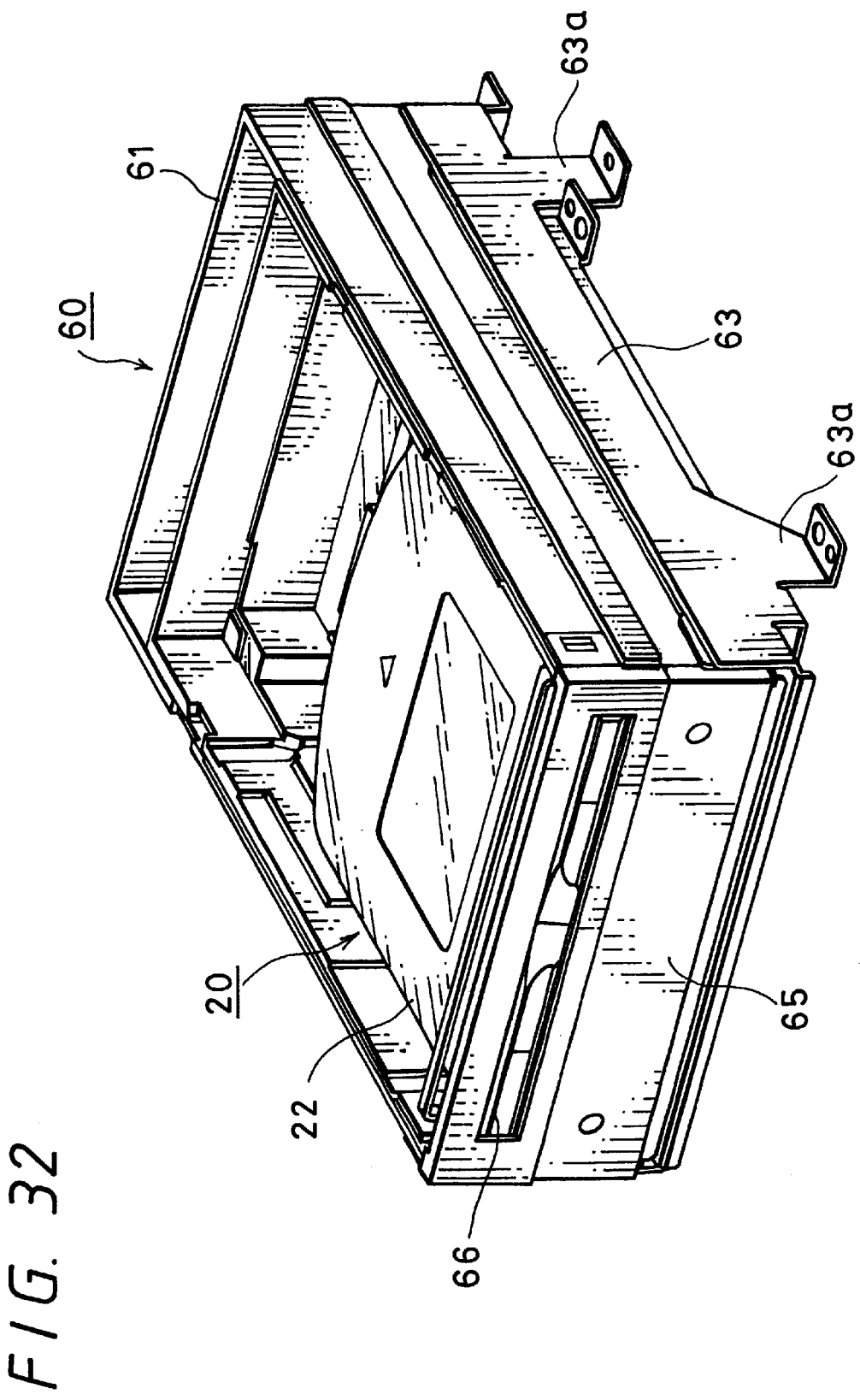
FIG. 32 is a perspective view illustrating the state obtained after the disk cartridge shown in FIG. 5 is inserted into the disk recording and reproducing apparatus which uses the disk cartridge according to the present invention.

FIG. 26 is an enlarged cross-sectional view taken along the line X—X in FIG. 25. FIG. 27 is a longitudinal cross-sectional view of a center portion to which reference will be made in explaining the arrangement of the disk cartridge shown in FIG. 25. FIGS. 28A and 28B are respectively diagrams to which reference will be made in explaining compared results obtained when dustproof effects of the disk cartridge according to the embodiment of the present invention and the disk cartridge according to the related-art are compared with each other. FIG. 29 is a block diagram showing a circuit arrangement of an information recording and reproducing apparatus which uses the disk cartridge according to the embodiment of the present invention. FIG. 30 is a perspective view illustrating the state obtained before the disk cartridge according to the present invention is being inserted into the information recording and reproducing apparatus shown in FIG. 29. FIG. 31 is a perspective view illustrating the state obtained while the disk cartridge according to the present invention is being inserted into the information recording and reproducing apparatus shown in FIG. 29. FIG. 32 is a perspective view illustrating the state obtained after the disk cartridge according to the present invention had been inserted into the information recording and reproducing apparatus shown in FIG. 29.

Figure 33:
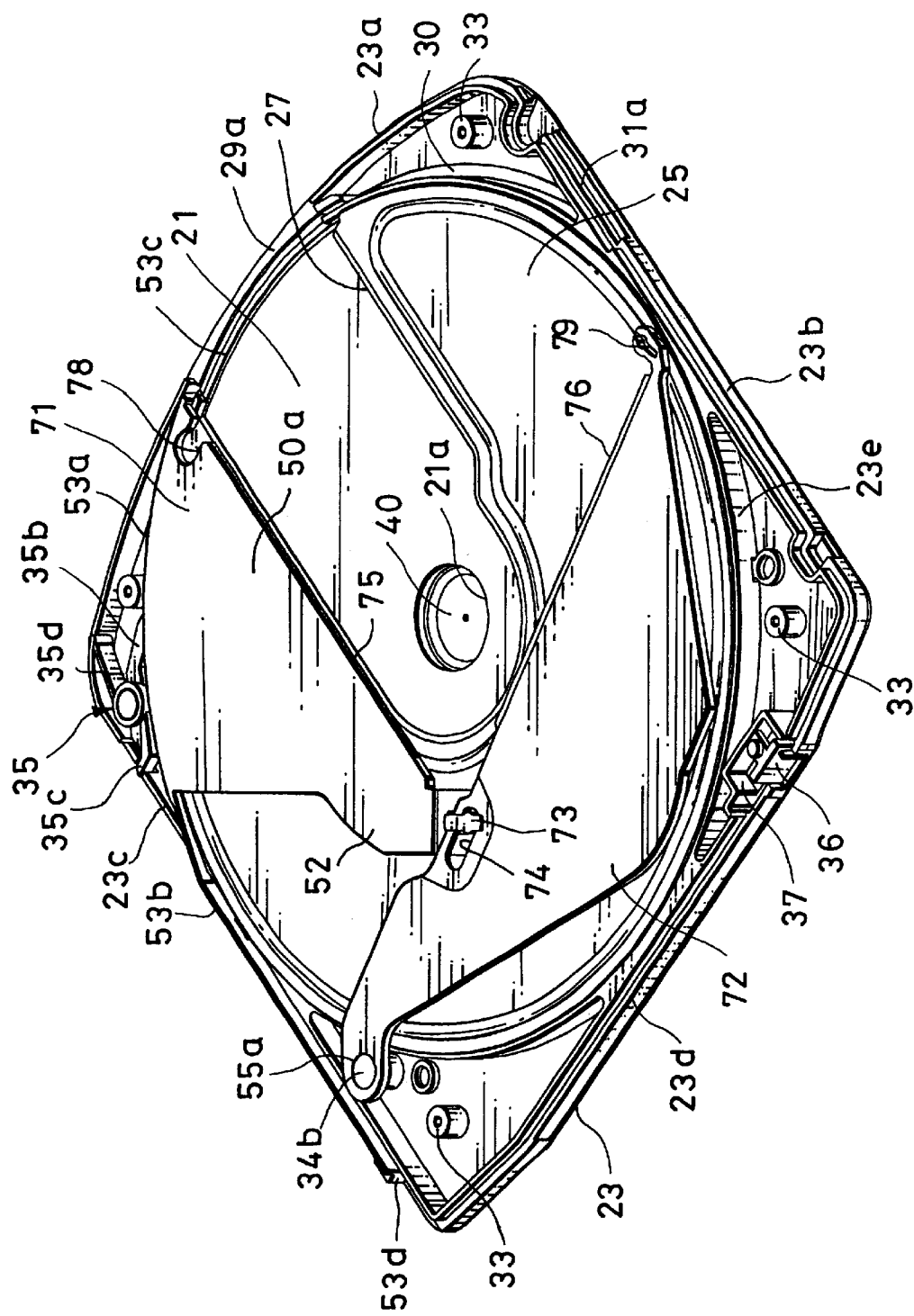
FIG. 33 is a perspective view showing a shutter mechanism of a disk cartridge according to a second embodiment of the present invention, and to which reference will be made in explaining the state in which the shutter mechanism assembled into the upper shell is being opened.
Figure 34:
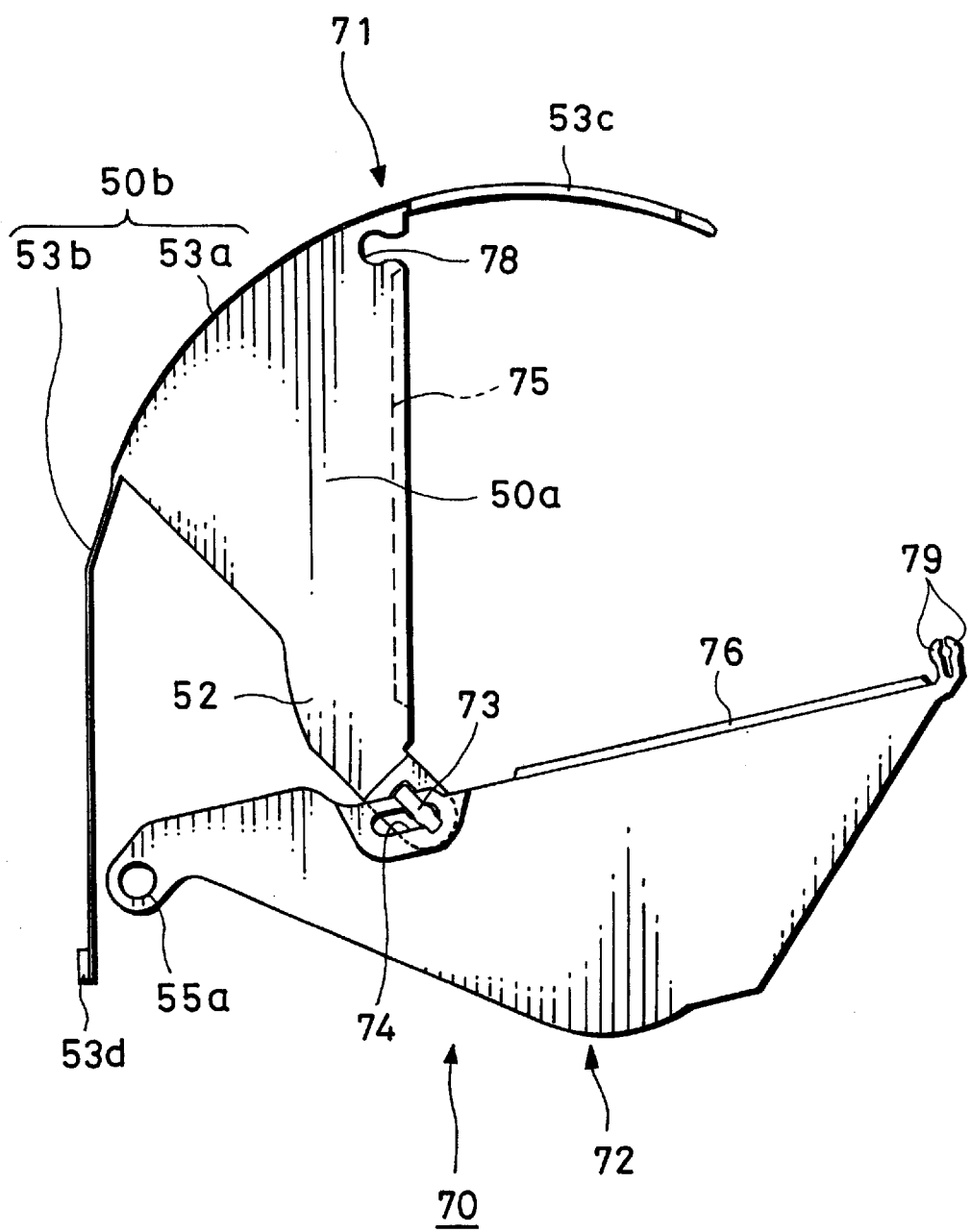
FIG. 34 is a plan view illustrating the state in which the shutter is being opened under the condition that the shutter mechanism shown in FIG. 33 is disassembled from the cartridge housing.
Figure 35:
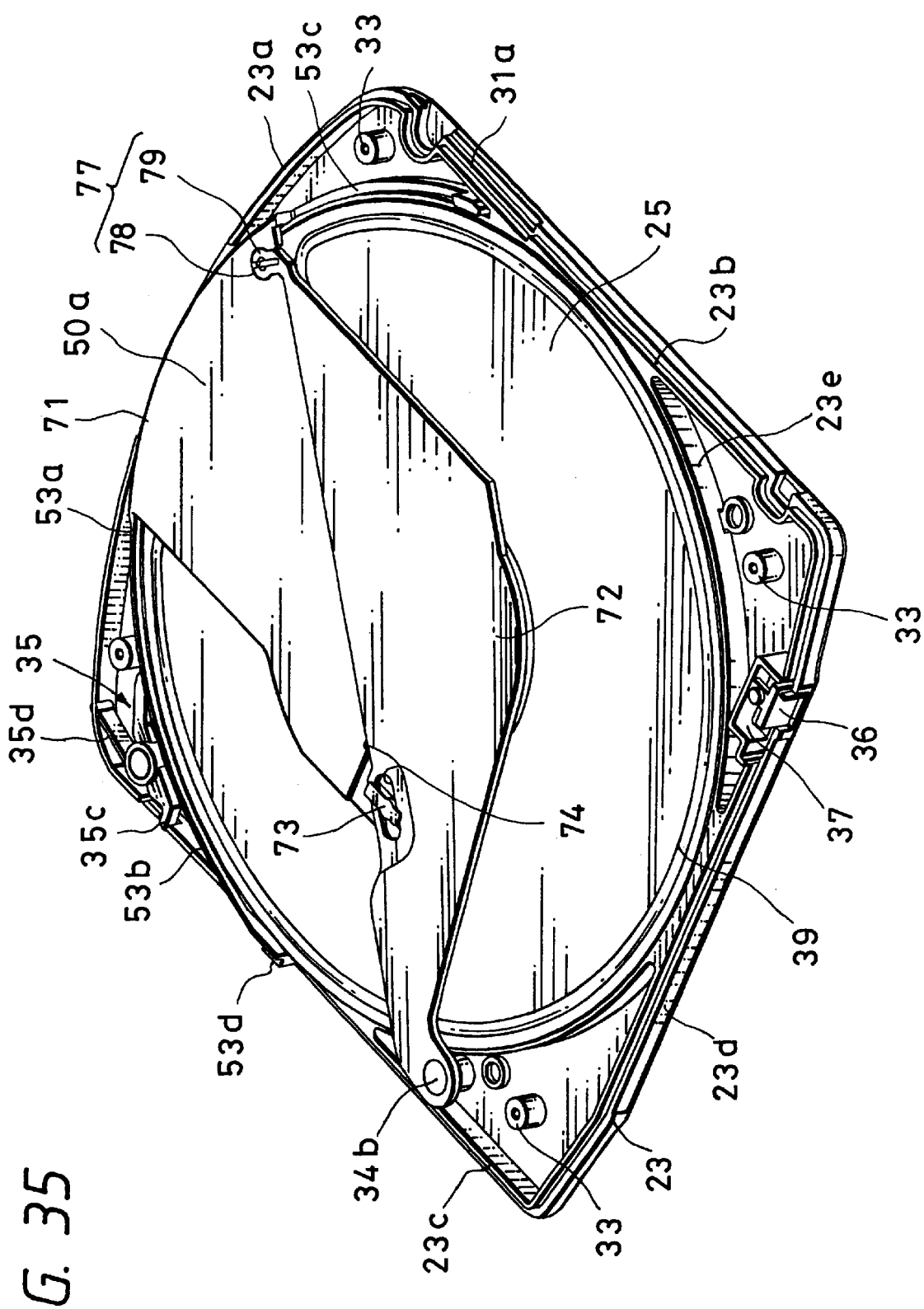
FIG. 35 is a perspective view showing the state in which the shutter mechanism shown in FIG. 33 is being closed.
Figure 36:
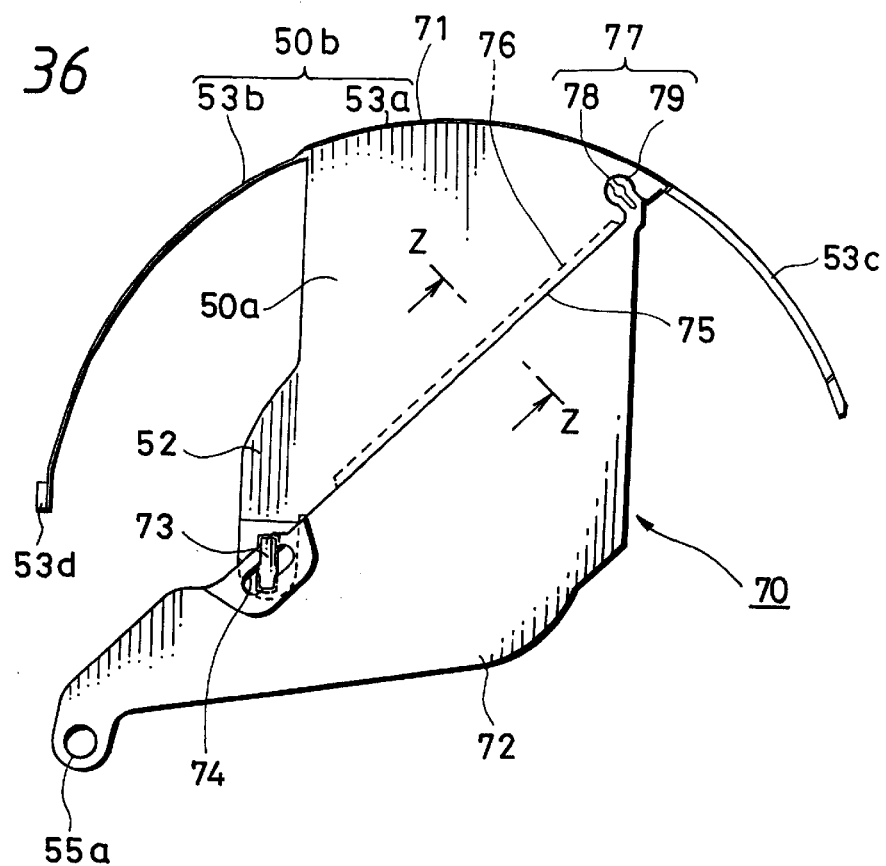
FIG. 36 is a plan view illustrating the state in which the shutter is being closed under the condition that the shutter mechanism shown in FIG. 35 is disassembled from the cartridge housing.
Figure 39A:
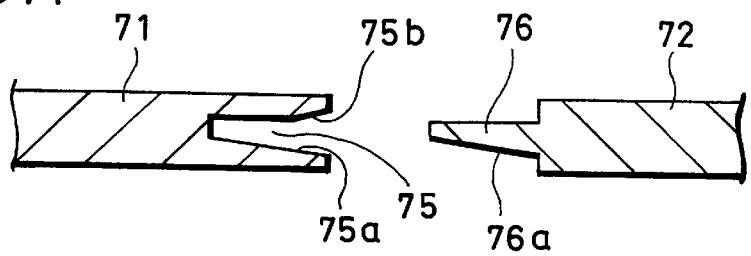
Figure 39B:
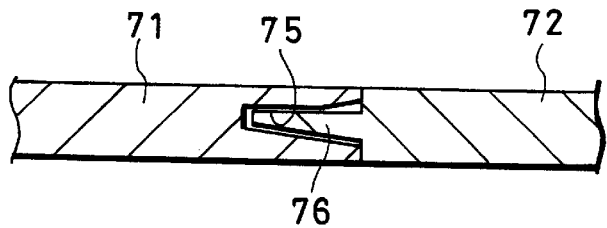

FIG. 32 through FIGS. 39A, 39B are diagrams showing a shutter mechanism of a disk cartridge according to a second embodiment of the present invention. Specifically, FIG. 33 is a perspective view showing the state in which a shutter mechanism according to the second embodiment of the present invention is assembled on the upper shell and opened. FIG. 34 is a bottom view showing the state in which the shutter mechanism according to the embodiment of the present invention is opened on the upper shell. FIG. 35 is a perspective view showing the state in which the shutter mechanism according to the embodiment of the present invention is assembled on the upper shell and closed. FIG. 36 is a bottom view showing the state in which the shutter mechanism according to the embodiment of the present invention is closed on the upper shell. FIGS. 37A and 37B are a bottom view and a plan view showing a main portion of the shutter mechanism in an enlarged-scale, respectively. FIGS. 38A and 38B are a fragmentary enlarged bottom view to which reference will be made in explaining the assembly processes of the first and second shutter members and a cross-sectional view taken along the Y—Y in FIG. 38A, respectively. FIGS. 39A and 39B are cross-sectional views taken along the line Z—Z in FIG. 36, respectively.

A disk cartridge 20 according to a first embodiment of the present invention accommodates a preformatted optical disk in which various information signals such as a music signal serving as audio information and a video signal and a music signal serving as video information have been previously recorded or a recordable optical disk 21 in which an information signal such as audio information and video information can be recorded once (write once read many optical disk) or an information signal can be recorded repeatedly (rewritable optical disk) as a disk-like recording medium. However, the disk-like recording medium is not limited to the above recording mediums and a magnetic disk in which a magnetic thin layer is deposited on the surface of a thin disk and information is stored based on a magnetization state at a specific position, a magneto-optical disk in which information is written in and read out from a similar magnetic thin layer by using an optical head and a magnetic head and other recording mediums can be applied to the present invention.

As shown in FIGS. 5 and 6, this disk cartridge 20 is comprised of a cartridge housing 22 consisting of a pair of an upper shell 23 and a lower shell 24 and a middle shell 25 which are fastened together, an optical disk 21 rotatably accommodated within a disk compartment 26 formed within this cartridge housing 22, a shutter mechanism 28 for opening and closing opening portions 27a, 27b formed on the lower shell 24 and the middle shell 25, or the like.

As shown in FIGS. 5 to 7, the upper shell 23 is comprised of a thin, substantially square-shape, dish-like member the front of which is shaped as a circular arc. The upper shell 23 is disposed in such a manner that its inner surface which is the concave portion is oriented downwards. The upper shell 23 has a front side wall 23a, right and left side walls 23b, 23c and a rear side wall 23d formed around its peripheral edge in such a manner that they are projected downwards. At the inside of these side walls 23a to 23d, there is provided a circular inner wall 23e which is continued along the inner circumferential direction inscribing the respective side walls 23a to 23d at the four sides. The middle shell 25 is fitted into the inside of the inner wall 23e, and the middle shell 25 and the upper shell 23 constitute the disk compartment 26.

In the center portion of the front side wall 23a of the upper shell 23 and the center portion of the inner wall 23e opposing the center portion of the front side wall 23a, there are formed recesses 29a, 29b which are used to allow the optical head of the optical pickup device to pass when the disk cartridge is loaded on the disk recording and reproducing apparatus. Further, between the front side wall 23a and the inner wall 23e, there is provided a belt-like guide portion 30 which is formed of a circular arc-like passage extending along the outer peripheral surface of the inner wall 23e. The belt-like guide portion 30 is extended from the inside of one side wall 23b to the inside of the other side wall 23c. Further, this belt-like guide portion 30 is communicated with the outside by a through-hole 29c which is extended through the side wall 23c.

From the left and right side walls 23b, 23c of the upper shell 23, there are extended side wall grooves 31a, 32a in the front and rear direction. The side wall grooves 31a, 32a are used to properly position a disk cartridge and to prevent an unsuitable disk cartridge from being inserted into the disk recording and reproducing apparatus by mistake when a disk cartridge is loaded onto the disk recording and reproducing apparatus. While one side wall groove 31a is formed up to only the front side portion of the upper shell 23, the other side wall groove 32a is extended up to the rear of the upper shell 23. The through-hole 29c is bored on this side wall groove 32a. Further, on the inside four corners of the upper shell 23, there are formed convex portions 33 which are used to fasten the lower shell 24 to the upper shell 23 by screws, respectively. Further, on the front corner portion of the right side wall 23c, there is provided a shaft convex portion 34a which is used to rotatably support a lock member 35.

As shown in FIG. 5 and FIG. 24A and 24B, the lock member 35 includes a cylindrical barrel shaft portion 35a which is rotatably fitted into the shaft convex portion 34a, a lock piece 35b projected from the outer peripheral surface of the barrel shaft portion 35a in the lateral direction, an operating piece 35c and a spring piece 35d. The lock piece 35b and the spring piece 35d are projected in the same direction and the operating piece 35c is projected in the direction opposite to the direction in which the lock piece 35b and the spring piece 35d are projected. The spring piece 35d is urged against the inner surface of the front side wall 23a of the upper shell 23, and the lock piece 35b is spring-biased toward the side of the belt-like guide portion 30 under spring force of the spring piece 35d. At the same time, the operating piece 35c is extended through the through-hole 29d bored on the right side wall 23c of the upper shell 23, and the tip end portion of the operating piece 35c is projected into the side wall groove 32a.

At the rear corner portion of the right side wall 23c side of the upper shell 23, there is provided a shaft convex portion 34b which is used to rotatably support the shutter mechanism 28. Further, at the rear corner portion of the left side wall 23b side, there is provided a preventing piece housing portion 37 which houses therein a mis-erase preventing piece 36 for preventing information recorded on the optical disk 21 from being erased by mistake. This preventing piece housing portion 37 includes an operation window 37a which is opened to the rear of the cartridge housing 22. The mis-erase preventing piece 36 is attached to the preventing piece housing portion 37 such that it can slide so as to open and close the operating window 37. The mis-erase preventing piece 36 includes an open and close portion 36a for opening and closing the operation window 37a and a resistance portion 36b for producing a sense of click when the open and close portion 36a is operated.

The upper shell 23 having the above arrangement should be suitably made of a synthetic resin such as ABS (acrylonitrile-butadiene-styrene resin) resin and HIPS (high-impact polystyrene). However, it is needless to say that other synthetic resins can be applied to the material of the upper shell 23 and that other metal materials such as aluminum alloy can be used as the material of the upper shell 23. In this embodiment, the upper shell 23 is formed by using ABS resins of two colors according to dichromatic molding. Specifically, as shown in FIG. 7, a transparent window 23A of a C-like shape is made of a colorless transparent ABS resin and other portions are made of an ABS resin of a proper color. A user can visually confirm the disk compartment 26 through this transparent window 23A.

The middle shell 25 fitted into the inner wall 23e of the above upper shell 23 has an arrangement shown in FIGS. 5, 6 and FIGS. 9 to 11. As illustrated, the middle shell 25 is formed of a thin, disk-like plate material and has an outer peripheral edge around which there is provided a side wall 25a which is projected to one surface side and which is continued to the circumferential direction. Further, the middle shell 25 has an opening portion 27 opened to a part of the outer peripheral edge and which is extended to the inside of the radius direction so as to reach the center portion. This opening portion 27 is opposed to an opening portion 38 of the lower shell 24, and the two opening portions 27, 38 are similar in shape and size.

These opening portions 27, 38 are used to accept and eject the turntable of the disk recording and reproducing apparatus and the optical head of the optical pickup device. The opening portions 27, 38 have proper shapes and sizes such that the above turntable and the optical head can be entered into and ejected from the opening portions 27, 38. Specifically, the center portions of the opening portions 27, 38 are table areas into and from which the turntable is entered and ejected. The head areas into and from which the optical head is entered and ejected are continuously formed on the table areas. The head areas are rectilinearly elongated to the outside of the radius direction and opened toward the outer peripheral edges. Further, on one of the side edge portions extended in the radius directions of the opening portions 27, 38, there are provided stepped portions 27a, 38a, whereby the head areas are made slightly wider than the table areas.

The middle shell 25 has a side wall 25a which is projected in a circular arc-fashion and a rib portion 39 endlessly continued along the circumferential direction. This rib portion 29 includes an inside rib portion 39a continued along the central inner peripheral edge of the opening portion 27 in a circular-arc fashion, an outside rib portion 39b continued along the circumferential direction of the side wall 25a and radius-direction rib portions 39c, 39c elongated along both side edges of the opening portion 27b in the radius direction, continued to the inside rib portion 39a, on the inside of the radius direction and which are continued to the outside rib portion 39b on the outside of the radius direction.

This rib portion 39 plays a role of increasing a strength and improving a flatness of the middle shell 25 so that a wobbling of the optical disk 21 may be eliminated or reduced. Further, of the rib portion 38, the inside rib portion 39a, plays a role of supporting the optical disk 21 accommodated within the middle shell 25. To this end, the inside rib portion 39a, is formed at the position opposing to the inner non-recording area formed in the vicinity of the center hole 21a of the optical disk 21. When this inside rib portion 39a, supports the inner non-recording area of the optical disk 21, an information recording surface provided outside the radius direction of the optical disk 21 may be prevented from coming in contact with the surface of the middle shell 25.

Specifically, a height H1 of the inside rib portion 39a, is set to be the highest height, a height H2 of the outside rib portion 39b is set to be the second height, and a height H3 of the radius-direction rib portion 39c is set to be the lowest height (H1>H2>H3). In this case, the height H1 of the inside rib portion 39a and the height H2 of the outside rib portion 39b may be identical to each other. However, the height of the radius-direction rib portion 39c is constantly set to be lower than those of the inside rib portion 39a and the outside rib portion 39b. When the above height relationship is established among the respective rib portions 39a, 39b and 39c, the radius-direction rib portion 39c can reliably be prevented from being brought in contact with the information recording surface of the optical disk 21.

The outside rib portion 39b of the rib portion 39 is formed at the position opposing to the outside non-recording area provided at the outer peripheral edge of the optical disk 21. Thus, even when the outer peripheral edge of the optical disk 21 is brought in contact with the surface of the middle shell 25, the information recording surface of the optical disk 21 can be avoided from being damaged by the outside rib portion 39b.

The middle shell 25 is shaped as a dome-like shell having a spherical surface portion in which a central portion is set to be high and an outer peripheral edge side is set to be low as shown in FIG. 10. Assuming now that Ha is a height of the center portion of the middle shell 25 and that Hb is a height of the outer peripheral edge of the middle shell 25, then a difference (H(=Ha−Hb) between the center portion and the outer peripheral edge should preferably be selected in a range of from 0.03 mm to 0.3 mm, and the most preferable value is selected to be approximately 0.1 mm. The middle shell 25 should be made of a stainless steel (SUS340), for example. When the middle shell 25 was made of a stainless steel having a thickness of 0.2 mm, excellent results could be obtained. However, it is needless to say that other metals than the stainless steel can be used and that synthetic resins such as ABS resin and HIPS also can be used as the material of the middle shell 25.

Further, a pair of positioning recess portions 27b, 27b are formed on the left and right open end edges of the opening portion 27 of the middle shell 25. The upper shell 23 has positioning convex portions opposing to the pair of positioning recess portions 27b, 27b, though not shown. Accordingly, when the recess portions 27b, 27b are brought in contact with the positioning convex portions and the middle shell 25 is fitted into the inner wall 23e of the upper shell 23, the middle shell 25 can properly be positioned onto the upper shell 23 automatically. Therefore, the opening portion 27 is opened under the condition that it is extended in the predetermined direction.

The optical disk 21 accommodated within the disk compartment 26 formed by the middle shell 25 and the upper shell 23 is made of a thin disk-like recording member having the center hole 21a bored at the center portion thereof. On one surface of the center portion of this optical disk 21, there is secured the center hub 40 so as to cover the center hole 21a by a suitable fixing means such as an adhesive. The center hub 40 is made of a magnetic material such as a sheet of iron that can be adsorbed by a magnet. A turntable of a disk rotation drive device housed within the disk recording and reproducing apparatus is fitted into this center hub 40. When this turntable and the center hub 40 are chucked with each other under magnetic attraction force from the magnet, the optical disk 21 is integrated with the rotational direction of the turntable and thereby rotated by the turntable.

On one surface of this optical disk 21, there are formed an information recording area 41 on which information can be recorded by the opposing optical head of the optical pickup device housed within the disk recording and reproducing apparatus and a non-recording area in which information cannot be recorded. The non-recording area is comprised of an inside non-recording area 42a having a predetermined width formed at the outside of the center hub 40 which is the inside of the optical disk 21 and an outside non-recording area 42b having a predetermined width formed at the outer peripheral edge of the optical disk 21. The information recording area 41 is provided between the inside and outside non-recording areas 42a and 42b. While the substrate of this optical disk 21 is suitably made of a synthetic resin such as polycarbonate (PC) and polyolefin, it is needless to say that the substrate of the optical disk 21 can be made of other synthetic resins and that the material of the substrate of the optical disk 21 is not limited to synthetic resins and the substrate of the optical disk 21 may be made of various materials such as a glass material and an aluminum alloy which can be used as an information recording medium.

As shown in FIGS. 5, 6, 8 and the like, the lower shell 24 has an outward appearance identical to that of the upper shell 23. The lower shell 24 is made of an approximately square, thin disk-like member the front of which is shaped as a circular arc. This lower shell 24 is disposed in such a manner that its inner surface which is the concave portion side is directed upwards. On the peripheral edge of the lower shell 24, there are upwardly projected a front a side wall 24a, left and right side walls 24b, 24c and a rear side wall 24d. On the front two left and right corner portions from which the front side wall 24a and the left and right side walls 24b, 24c are continued, there are provided circular arc-like inner walls 24e, 24e. On the outside of each inner wall 24e, there are provided outer walls 24f, 24f with predetermined spaces among the front side wall 24a and the left and right side walls 24b, 24c.

Further, the lower shell 24 has the opening portion 38 bored at the center of the front portion and which is rectilinearly extended in the rearward. This opening portion 38 makes a pair with the opening portion 27 of the middle shell 25. Upon assembly, the two opening portions 27, 38 are bored so as to become identical to each other.

Consequently, when the upper shell 23 is assembled on the lower shell 24 and are fastened together, the front side wall 23a, the left and right side walls 23b, 23c and the rear side wall 23d of the upper shell 23 are fitted into the inside of the front side wall 24a, the left and right side walls 23b, 23c and the rear side wall 24d of the lower shell 24. Then, the inner wall 24e of the lower shell 24 is located so as to oppose to the outside of the inner wall 23e of the upper shell 23 with a predetermined space. By a circular arc-like space portion set between the inner wall 23e of this upper shell 23 and the inner wall 24e of the lower shell 24, there is formed the belt-like guide portion 30 which can guide the belt-like portion provided on the first shutter member of the shutter mechanism 28.

Within the areas encircled by the inner walls 24e and the outer walls 24f of the lower shell 24, there are respectively formed convex portions 44 into which there are inserted fixing screws to fasten the upper shell 23 and the lower shell 24. These convex portions 44 are also formed at two corner portions of the rear side of the lower shell 24. Further, a pair of convex portions 45, 45 are provided in the vicinity of the two corner portions of the rear side of the lower shell 24. Then, the convex portions 45 have bored thereon a pair of positioning holes 45a, 45b which are used to properly locate the disk cartridge 20 at the predetermined position of the disk recording and reproducing apparatus.

Figure 4:
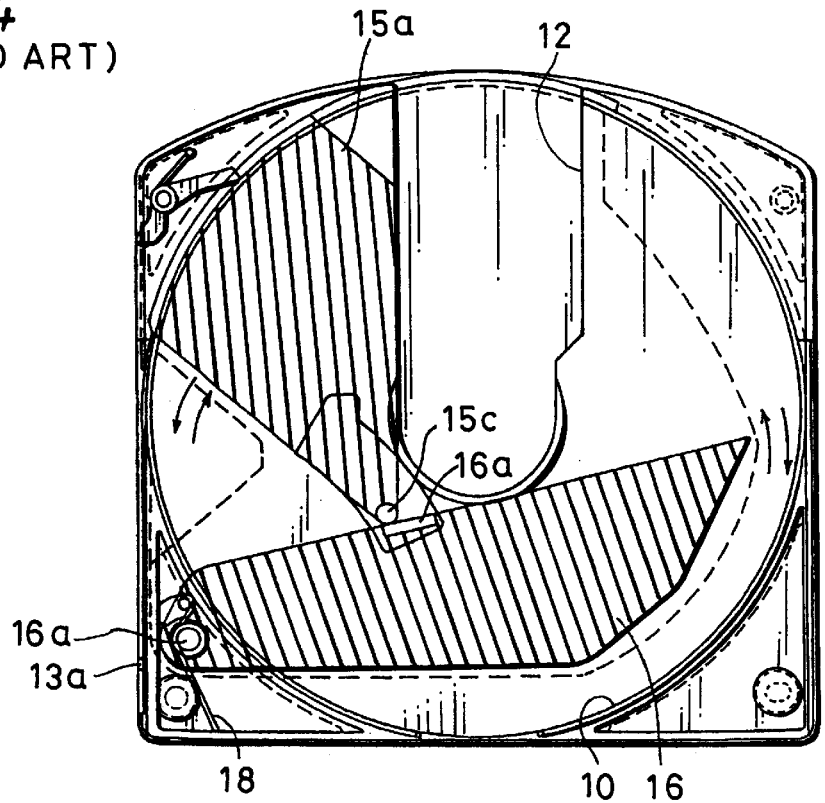
FIG. 4 is a diagram showing the manner in which the shutter mechanism of the related-art disk cartridge shown in FIG. 2 is opened and closed and to which reference will be made in explaining the state in which the shutter is opened.

Reference numeral 46 in FIGS. 4 and 21 depicts a display hole which is used to expose part of the lower surface of the above mis-erase preventing piece 36. Therefore, according to this embodiment, the state of the mis-erase preventing piece 36 can be visually confirmed by a user or automatically detected by a machine from the two directions of the rear and the lower surface of the disk cartridge 20. If the above display hole 46 is bored on the upper shell 23, then the state of the mis-erase preventing piece 36 can be visually confirmed by a user from the three directions of the rear, the lower surface and the upper surface.

On the left and right side walls 24b, 24c of the lower shell 24, there are provided the side wall grooves 31b, 32b which are similarly extended in the front and rear direction so as to be respectively integrated with the side wall grooves 31a, 32a provided on the left and right side walls 23b, 23c of the upper shell 23. When the side wall groove 31b, 32b are integrated with the side wall grooves 31a, 32a, there can be formed the guide grooves 31, 32, respectively. Specifically, while one side wall groove 31b is formed only on the front side portion of the lower shell 24, the other side wall groove 32b is extended through the rear of the lower shell 24. This side wall groove 32b has bored thereon the through-hole 29c which communicates with the inside of the inner wall 24e. On the inner wall 24e at its side in which the through-hole 29c is bored, there is formed a recess 47 through which the lock piece 35b of the lock member 35 is entered into and ejected from the lower shell 24.

The lower shell 24 having the above arrangement is suitably made of a synthetic resin such as ABS resin and HIPS, for example. However, it is needless to say that other synthetic resins can be applied to the lower shell 24 and that the lower shell 24 can be made of an aluminum alloy and other metal materials. Further, it is needless to say that the lower shell 24 can be made of synthetic resins of two colors or more than three colors by dichromatic molding or polychromatic molding.

As shown in FIGS. 5, 6 and FIGS. 12 to 16, the shutter mechanism 28 is comprised of a pair of shutter members formed by a combination of a first shutter member 50 and a second shutter member 51. The first shutter member 50 includes a substantially fan-shaped shutter portion 50a for opening and closing the head areas of the opening portions 27, 38 and a belt-like portion 50b continued to the tip end portion of this shutter portion 50a. The belt-like portion 50b is curved in a circular-arc fashion and thereby is integrated with the shutter portion 50a. On the center of the shutter portion 50, there is projected an arm portion 52 which is curved to the lateral direction. This arm portion 52 has at its tip end portion a barrel shaft portion 52a projected to one surface side in an annular fashion. While this barrel shaft portion 52a can be formed by burring, for example, the barrel shaft portion 52a can be replaced with a shaft pin inserted into the tip end portion of the arm portion 52 by caulking or with pressure.

The belt-like portion 50b of the first shutter member 50 is projected from the tip end edge of the shutter portion 50a to one surface side. The whole of the belt-like portion 50b is shaped like an arc having a radius of curvature which is substantially the same as that of the belt-like guide portion 30. This belt-like portion 50b includes a thick portion 53a which increases its thickness from the whole of the tip edge of the shutter portion 50a to one projected side and a thin portion 53b which decreases its thickness from one end of the thick portion 53a to the other projected side. The thick portion 53a of the belt-like portion 50b is rendered a proper rigidity to an extent that it can hold its shape of curved surface. Thus, the thick portion 53a of the belt-like portion 50b can be guided by the belt-like portion 30 so that it can easily be moved in a curve motion. This thick portion 53a has at its tip end portion a recess 53c which reduces one side of the thick portion 53a in the width direction over a proper length. This recess 53c is used to allow the optical head to enter the opening portions 27, 38 while the first shutter member 50 is being opened.

The thin portion 53b of the belt-like guide portion 30 is made thinner than the thick portion 53a and rendered a proper elasticity so that the thin portion 53b can easily be elastically deformed in the thick portion. Thus, as shown in FIGS. 16 and 23, when the first shutter member 50 is moved in the opening direction, the thin portion 53b is guided by the guide groove 32 of the cartridge housing 22 and can easily be changed from the curve motion to the linear motion. Further, the thin portion 53b has at its tip end portion a protrusion-like operation portion 53d to which external force is applied when the shutter mechanism 28 is opened and closed. This operation portion 53d is projected into the guide groove 32 under the state in which the first shutter member 55 is assembled on the cartridge housing 22.

Further, the thin portion 53b has at its intermediate portion a lock aperture 54 which is engaged with the lock piece 35b of the lock member 35. This lock aperture 54 is set at the position facing to the lock mechanism while the first shutter member 50 is being opened. When the lock piece 35b is engaged with the lock aperture 54, the first shutter member 50 is locked and thereby the shutter mechanism 28 is held in the opened state.

The second shutter member 51 includes an inside shutter piece 51a and an outside shutter piece 51b both of which are shaped as substantially triangles so as to be overlapping with each other as the shutter portion. The outside shutter piece 51b is provided with a coupling portion 51c for coupling it and the inside shutter piece 51a and an arm portion 55 projected toward the opposite side. At the tip end portion of the arm portion 55, there is provided a barrel shaft portion 55a which becomes the center about which the second shutter member 51 is rotated. This barrel shaft portion 55a is formed by burring the hole bored at the tip end of the arm portion 55. The barrel shaft portion 55a is projected toward the inside shutter piece 51a. This barrel shaft portion 55a is fitted into the shaft convex portion 34b of the upper shell 23, whereby the second shutter member 51 is supported to the cartridge housing 22 so as to become rotatable.

At the coupling portion in which the outside shutter piece 51b is coupled to the arm portion 55, there is formed an engagement hole 56 which is used to rotatably couple the first shutter member 50 to the cartridge housing 22. This engagement hole 56 is extended in the direction in which an overlapping edge 57b, which overlaps an overlapping edge 57a of the shutter portion 50a of the first shutter member 50, is extended. One end of the engagement hole 56 increases its diameter in the arm portion 55 side as compared with other portions. This large diameter portion 56a allows the barrel shaft portion 52a to be inserted into the engagement hole 56 with ease. The coupling portion 51c has at its tip end portion a recess 51d which is used to pass the shutter portion 50a.

Thus, as shown in FIGS. 14 and 16, when the barrel shaft portion 52a of the first shutter member 50 is engaged with the engagement hole 56 of the second shutter member 51, the shutter mechanism 28 comprised of the pair of first and second shutter members 50, 51 can be assembled partially.

The first and second shutter members 50, 51 having the above arrangements are made of a single material of metal or synthetic resin by using a stainless steel and other metals and synthetic resins such as ABS resin and HIPS. Further, the two shutter members 50, 51 may be made of a composite material of a combination of a metal and a synthetic resin. For example, the portion in which the first shutter member 50 and the second shutter member 51 overlap with each other is coated with a synthetic resin having a small frictional coefficient. Consequently, while the shutter mechanism 28 is being reduced in thickness owing to the rigidity of the metal, frictional force at the contact portion can be alleviated and hence durability of the shutter mechanism 28 can be increased.

The disk cartridge 20 according to this embodiment can be assembled as follows, for example. The assembly operation of this disk cartridge 20 is executed in the state in which the upper shell 23 is directed downwards as shown in FIG. 6. First, the optical disk 21 is accommodated into the inner wall 23e of the upper shell 23 shown in FIG. 7. At that very moment, the optical disk 21 is accommodated into the inner wall 23e under the state in which the surface of the center hub 40 is oriented downwards. FIG. 17 is a plan view illustrating the state in which the optical disk 21 is accommodated into the inner wall 23e of the upper shell 23.

Then, as shown in FIG. 18, the middle shell 25 is fitted into the inner wall 23e under the state in which its flat surface portion is directed upwards. At that very moment, in the middle shell 25, its opening portion 27 is fitted into the side in which the recesses 29a, 29b are formed on the upper shell 23 and the recess portion 27b is opposed to the positioning protrusion of the upper shell 23, whereby the middle shell 25 is automatically and properly positioned onto the upper shell 23 and the optical disk 21 is accommodated into the disk compartment 26 comprised of the middle shell 25 and the upper shell 23 so as to become freely rotatable.

Next, as shown in FIG. 19, the first shutter member 50 is fitted into the predetermined position. Specifically, the belt-like portion 50b is inserted into the belt-like guide portion 30 in such a manner that the shutter portion 50a of the first shutter member 50 may cover the head area of the opening portion 27 of the middle shell 25. At that very moment, the belt-like portion 50b is formed as a circular arc-shape having substantially the same radius of curvature as that of the belt-like guide portion 30, and the belt-like portion 50b is extended along the belt-like guide portion 30. Accordingly, since the belt-like portion 50b, in particular, the thin portion 53b need not be curved as a circular arc shape having substantially the same radius of curvature as that of the circular arc of the belt-like guide portion 30, the assembly operation of the first shutter member 50 can be carried out easily and rapidly. In particular, although the through-hole 29c communicated with the guide groove 32 formed on one side surface of the cartridge housing 22 has a smaller space as compared with other portions, since the thin portion 53b is curved along the through-hole 29c, the thin portion 53b can easily pass the through-hole 29c.

Next, the second shutter member 51 is assembled onto the first shutter member 50. At that very moment, as shown in FIG. 16, while the shutter is being opened, the second shutter member 51 is assembled onto the first shutter member 50 and the barrel shaft portion 52a is inserted into the large diameter portion 56a of the engagement hole 56. Thereafter, the second shutter member 51 is slid slightly and the barrel shaft portion 52a is moved from the large diameter portion 56a to the engagement hole 56. At the same time, the overlapping edge 57b of the second shutter member 51 is moved close to the overlapping edge 57a of the first shutter member 50, whereby the overlapping edges 57a, 57b are overlapped with each other. Then, the barrel shaft portion 55a of the second shutter member 51 is fitted into the rear shaft convex portion 34b of the upper shell 23.

Further, the mis-erase preventing piece 36 is accommodated within the preventing piece housing portion 37 of the upper shell 23. The lock member 35 is attached to the predetermined position of the upper shell 23. Specifically, the barrel shaft portion 35a of the lock member 35 is fitted into the front shaft convex portion 34b and the operating piece 35c is inserted into the through-hole 29d of the side wall 23c from the inside. Then, the spring piece 35d is brought in contact with the inner surface of the front side wall 23a. As a result, the lock member 35 is spring-biased in the clockwise direction in FIG. 24A under spring force of the spring piece 35d, whereby the tip end portion of the lock lever 35b is urged against the thin portion 53b of the belt-like portion 50b of the first shutter member 50 from the outside. At the same time, the tip end portion of the operating piece 35c is extended through the through-hole 29d and projected into the guide groove 32. FIG. 20 shows this state.

Thereafter, the lower shell 24 is attached to the upper shell 23. Then, the lower shell 24 is fastened to the upper shell 23 by using four fixing screws. FIG. 21 shows this state. FIG. 22 shows a relationship between the lower shell 24 and the shutter mechanism 28. The shutter mechanism 28 shown by a solid line in FIG. 22 shows the state in which the opening portion 38 of the lower shell 24 is closed. The opening portion 38 is completely closed by the pair of shutter members 50, 51. The closed state of the shutter mechanism 28 shown by the solid line corresponds to the state shown in FIG. 20.

Figure 1:
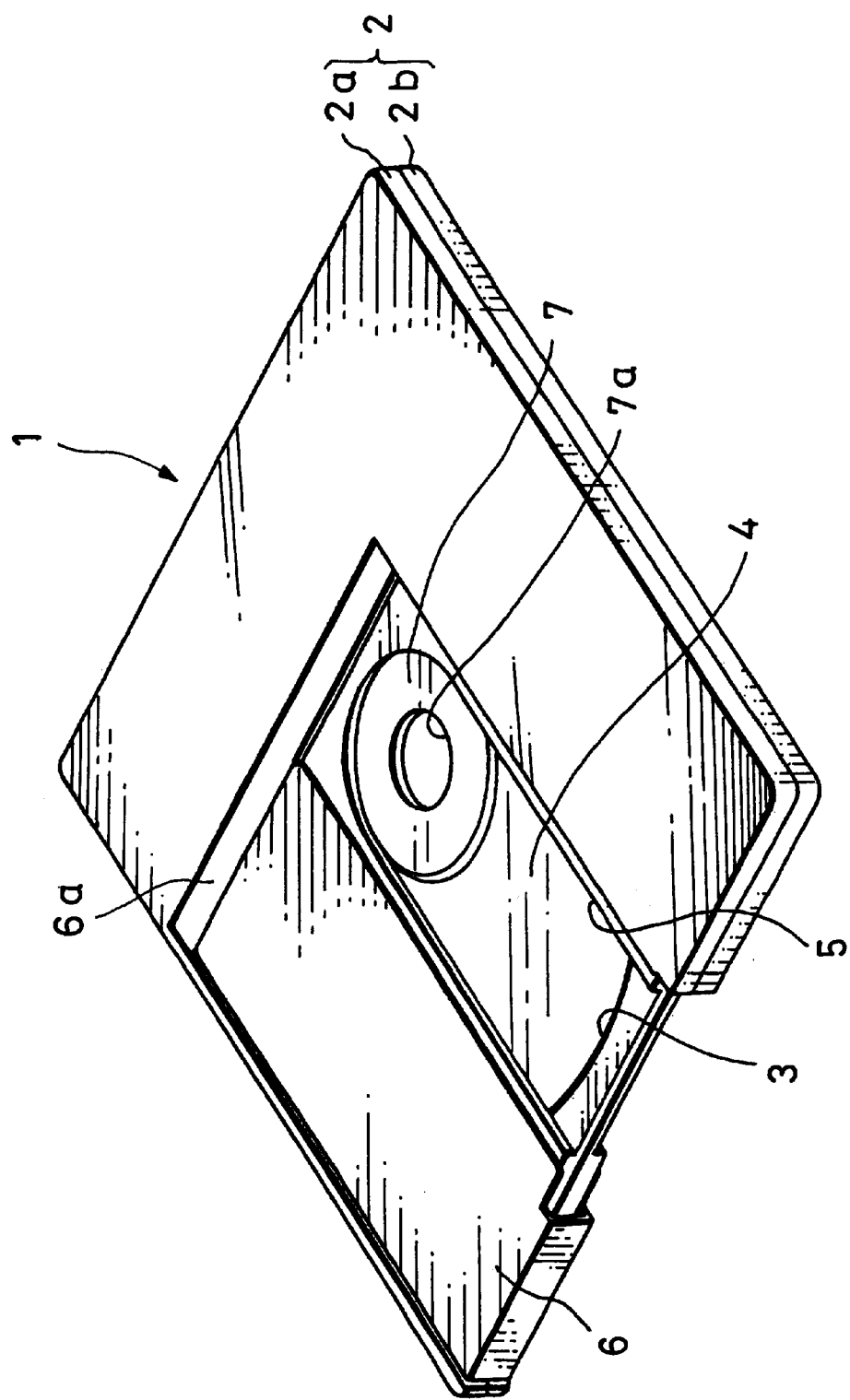
FIG. 1 is a perspective view illustrating a first example of a disk cartridge according to the related art.
Figure 2:
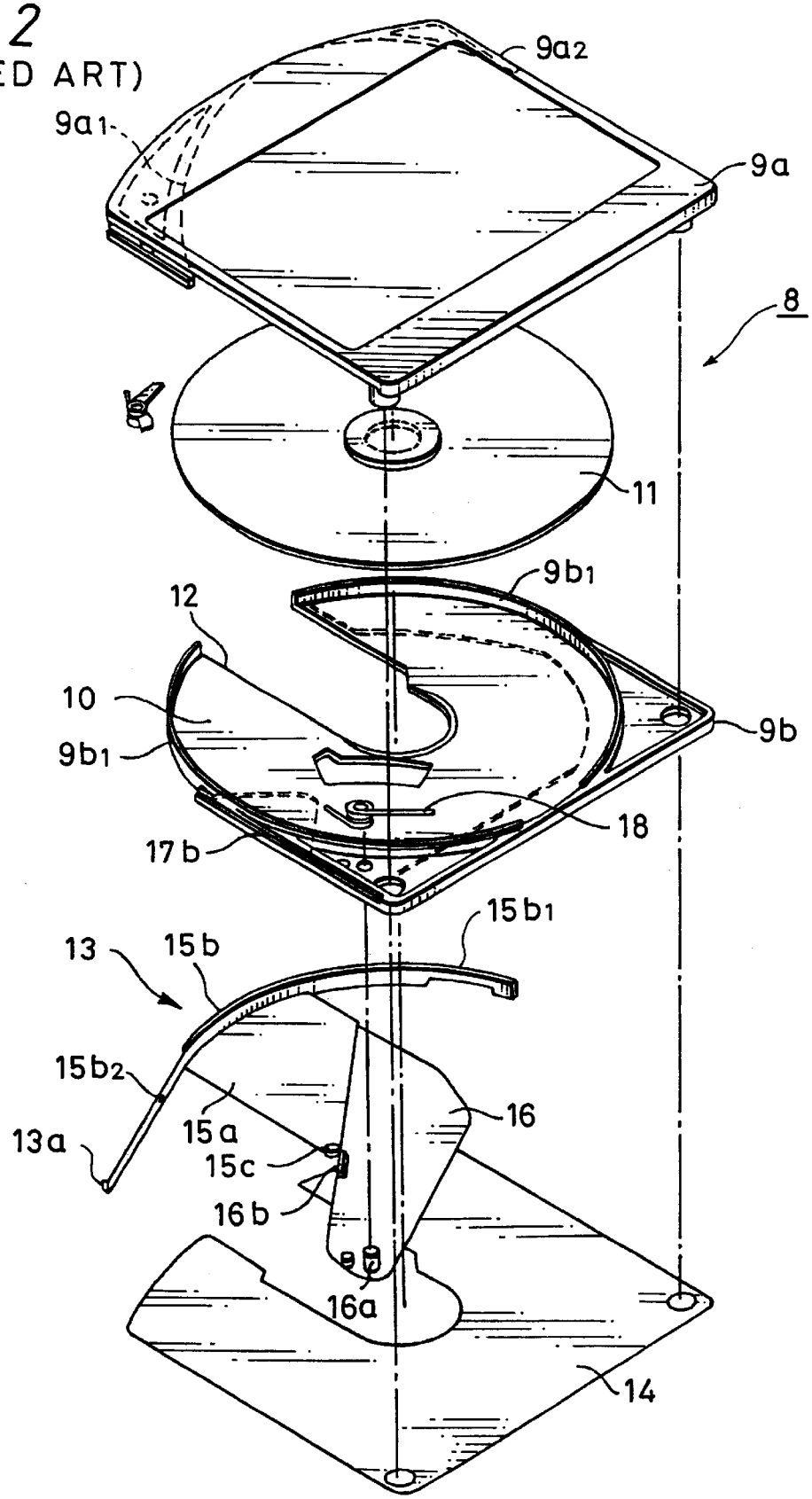
FIG. 2 is an exploded perspective view illustrating a second example of a disk cartridge according to the related art.
Figure 3:
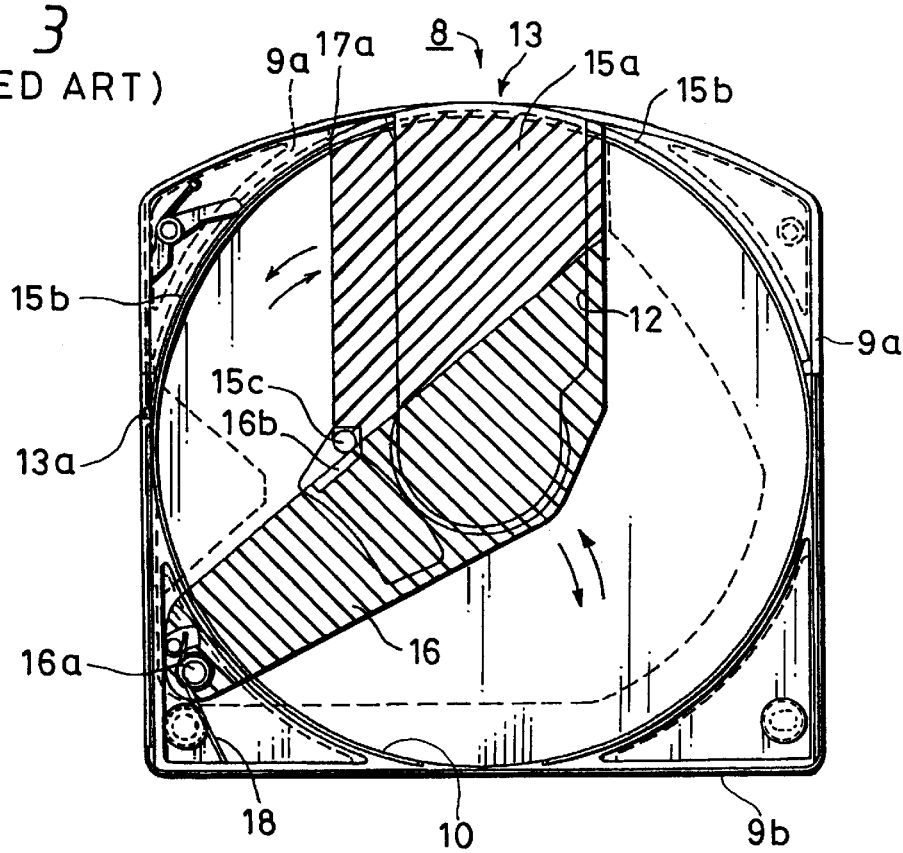
FIG. 3 is a diagram showing the manner in which a shutter mechanism of the related-art disk cartridge shown in FIG. 2 is opened and closed and to which reference will be made in explaining the state in which the shutter is closed.

In this case, between the pair of shutter members 50, 51 and the opening portion 38, there is set a proper overlapping portion over the whole periphery of the opening portion 38. In addition, the pair of shutter members 50, 51 are overlapping with each other at its whole portion crossing the opening portion 38 by their overlapping edges 57a, 57b. Accordingly, as shown in FIG. 28A, a labyrinth effect is produced by these overlapping portions so that dusts or the like can be prevented from entering into the whole periphery of the opening portion 38. Therefore, it is possible to effectively suppress or prevent dusts or the like from entering into the disk cartridge 20. On the other hand, as shown in FIG. 28B, since the disk cartridge according to the related art (FIG. 1) has the structure such that the shutter member 6 is located outside the upper shell 2a, a labyrinth effect is not produced by the shutter member 6 and the upper shell 2a with the result that dusts or the like can relatively easily enter the conventional disk cartridge.

The shutter mechanism 28 shown by a dots-and-dash line in FIG. 22 shows the state in which the opening portion 38 of the lower shell 24 is being opened. The opening portion 38 is completely opened by the pair of shutter members 50, 51. The state in which the shutter mechanism 28 is being opened as shown by the dots-and-dash line in FIG. 22 corresponds to the state shown in FIG. 23.

The disk cartridge 20 shown in FIG. 25 is manufactured by executing the above assembly operation. According to this disk cartridge 20, the cartridge housing 22 is comprised of the upper shell 23, the middle shell 25 and the lower shell 24. Then, the optical disk 21 is rotatably accommodated into the disk compartment 26 comprised of the upper shell 23 and the middle shell 25. FIGS. 26 and 27 show the cross-section of this disk cartridge 20. FIG. 26 is a cross-sectional view taken along the line X—X in FIG. 25 and in which respective assemblies are illustrated realistically. On the other hand, FIG. 27 schematically illustrates the arrangement of the disk cartridge 20 and in which dimensions such as a thickness of each of the assemblies are not actual ones.

Before the disk cartridge 20 having the above arrangement is loaded on the disk recording and reproducing apparatus, the shutter mechanism 28 is set in the state shown in FIG. 20 and FIG. 25 to 27. Specifically, the shutter mechanism 28 is being placed in the state in which it has closed the opening portion 27 of the middle shell 25 and the opening portion 38 of the lower shell 24 completely due to tares of the pair of shutter members 50, 51 and frictional force generated between the upper and lower shells 23 and 24, or the like. Further, as shown in FIG. 24A, the lock lever 35b of the lock member 35 is engaged with the lock hole 54 bored on the belt-like portion 50b of the first shutter member 50. Therefore, the shutter mechanism 28 is locked by the lock mechanism and thereby held in the estate in which it has closed the opening portion 38 completely.

When the disk cartridge 20 in the above state is inserted into the disk recording and reproducing apparatus 60 as shown in FIGS. 30 to 32, the locked state of the lock member 35 is released by a shutter open and close mechanism provided on this disk recording and reproducing apparatus 60. Thereafter, the shutter mechanism 28 is released by this shutter open and close mechanism and the opening portions 27, 38 are both opened. The manner in which this shutter mechanism 28 is opened and closed will be described in detail later on.

Next, the disk recording and reproducing apparatus 60 will be described. As shown in FIGS. 30 to 32, this disk recording and reproducing apparatus 60 is comprised of an outer case 61 formed of a hollow casing, a recording and reproducing apparatus body 62 accommodated into this outer case 61, or the like. As shown in FIG. 30, this outer case 61 is comprised of a case body 63 whose upper surface and front surface are opened, a case lid 64 detachably attached to the upper portion of the outer case 61 so as to close the upper surface of the case body 63, a front panel 65 detachably attached to the front portion of the outer case 61 so as to close the front surfaces of the case body 63 and the case lid 64, or the like.

On the four places of the case body 63, there are provided leg members 63a which are projected downwards. These leg members 63a support the disk recording and reproducing apparatus 60 and the disk recording and reproducing apparatus 60 can be attached to the proper position. The front panel 65 is formed of an oblong plate-like member and a cartridge slot 66 is formed at the upper portion of the front panel 65. The cartridge slot 66 has a dimension which is approximately the same as that of the front side of the disk cartridge 20. This cartridge slot 66 is constantly closed by an openable and closable lid 67 which is located at the inside of the cartridge slot 66.

When a user presses this openable and closable lid 67 by the front portion of the disk cartridge 20 and inserts the disk cartridge 20 into a predetermined position as shown in FIG. 31, the disk cartridge 20 is automatically loaded by a loading mechanism, not shown. Then, the disk cartridge 20 that has been conveyed by the loading mechanism is properly positioned and fixed to a predetermined position as shown in FIG. 32. At the same time or before or after the disk cartridge 20 is properly positioned and fixed to the predetermined position, the opening portions 27, 28 are opened by the start of the shutter mechanism 28.

Thereafter, a turntable 68a of a disk rotary drive apparatus 68 and an optical head 69a of an optical pickup device 69 are entered into the opening portions 27, 38 thus opened. Then, the turntable 68a is engaged with the center hole 21a of the optical disk 21 and the center hub 40 is adsorbed by magnetic force from a magnet housed within the turntable 68a and thereby the optical disk 21 is supported to the turntable 68a. At the same time or before or after the optical disk 21 is supported to the turntable 68a, the optical head 69a approaches to the information recording area of the optical disk 21 at its predetermined position. As a consequence, it becomes possible for the disk recording and reproducing apparatus 60 to record and reproduce an information signal on and from the optical disk 21.

This disk recording and reproducing apparatus 60 is comprised of elements and parts shown in FIG. 29, for example. Specifically, as shown in FIG. 29, the recording and reproducing apparatus body 62 includes three control devices of a system controller S1, a memory controller S5 and a drive controller D1. The system controller S1 and the memory controller S5 are directly connected together, and a read-only memory (ROM) S2 and a random-access memory (RAM) S3 are connected to a connection line by which the system controller S1 and the memory controller S5 are directly connected together. Further, a memory S4 and MPEG2 (moving picture experts group 2) (moving picture compression system applied to the existing television broadcasting capable of 3M to 40 Mbps, HDTV (high-definition television) and broadband ISDN, etc.) encoder S6 and decoder S7 are connected to the memory controller S5. Furthermore, a control panel S8 and a remote control signal receiving section S9 are connected to the system controller S1.

An ECC (error-correction coder) D4 is connected to the drive controller D1, and a memory (ROM) D2, a memory (RAM) D3, a servo circuit D6 and an address decoder D7 are connected to a connection line by which the ECC D4 is connected to the drive controller D1. Further, a recording error judgment circuit D8 for judging errors occurring upon recording is connected to the drive controller D1. This drive controller D1 is connected through a command interface (not shown) to the system controller S1. The drive controller D1 is connected to the ECC D4 and is also connected to the memory controller S5 through a data interface (not shown). The drive controller D1 is also connected to a modem (modulator and demodulator) circuit D5. The modem circuit D5 is connected to the optical head 69a of the optical pickup device 69.

The servo circuit D6 is connected to a spindle motor 68 serving as the disk rotary drive device, the optical pickup device 69 and the recording error judgment circuit D8. Further, the optical pickup device 69 is connected to the address decoder D7, and the address decoder D7 is also connected to the recording error judgment circuit D8.

When the disk cartridge 20 is inserted into the disk recording and reproducing apparatus 60 from the cartridge slot 66 of the disk recording and reproducing apparatus 60 having the above arrangement, a grip portion of a shutter open and close mechanism (not shown) incorporated within the disk recording and reproducing apparatus 60 is entered into the guide groove 32 formed on one side surface portion of the disk cartridge 20. As a result, the above grip portion grips the operation portion 53d of the shutter mechanism 28 projected into the guide groove 32. Because this grip portion is not moved in the insertion direction of the disk cartridge 20, the operation portion 53d is relatively withdrawn in response to the amount in which the disk cartridge 20 is inserted into the disk recording and reproducing apparatus body 62.

At that very moment, the belt-like portion 50d of the first shutter member 50 is pulled by pulling force inputted to the operation portion 53d so that this belt-like portion 50b is guided by the belt-like guide portion 30 on the upper shell 23 and thereby rotated and moved in the counter-clockwise direction in FIG. 20. Since the belt-like portion 50b is rotated and moved along the outer peripheral surface of the inner wall 23e of the upper shell 23, the belt-like portion 50b can be smoothly rotated and moved although it is rotated and moved in a circular-arc motion. When this belt-like portion 50b is moved, the shutter portion 50a which covers the head areas of the opening portions 27, 38 is similarly rotated in the counter-clockwise direction. As a result, as shown in FIG. 23, there are opened the head areas of the opening portions 27, 38 that have been covered with the shutter portion 50a.

In that case, the first shutter member 50 is rotated about the center portion of the disk compartment 26 and thereby moved. Consequently, the barrel shaft portion 52a provided at the tip end portion of the arm portion 52 continued to the inside of the shutter portion 50a is similarly rotated and thereby moved to the rear side of the cartridge housing 22. Because the engagement hole 56 of the second shutter member 51 is engaged with this barrel shaft portion 52a, the barrel shaft portion 52a is moved to the rear side of the cartridge housing 22, whereby the second shutter member 51 is pushed toward the rear side of the disk cartridge 22 with pressure. At that very moment, since the barrel shaft portion 55a of the second shutter member 51 is engaged with the rear shaft convex portion 34b of the upper shell 23, the second shutter member 51 is rotated about this rear shaft convex portion 34b and moved in the clockwise direction in FIG. 20.

Consequently, as shown in FIG. 23, the second shutter member 51 is moved to the rear side of the disk cartridge 22, whereby the table areas of the opening portions 27, 38 that had been covered with the second shutter member 51 are opened. Therefore, since the first and second shutter members 50, 51 which have covered the opening portions 27, 38 are both moved to the opening side, the whole of the opening portions 27, 38 is opened to expose part of the optical disk 21 so that the turntable 68a and the optical head 69a can be inserted into the opening portions 27, 38.

At that very moment, when the belt-like portion 50b of the first shutter member 50 is withdrawn to a predetermined position, the disk cartridge 20 and the shutter open and close mechanism are made to stopp moving relatively to each other and the state in which the operation portion 53d gripped by the grip portion is continued. As a consequence, the first shutter member 50 is locked by the shutter open and close mechanism under the condition that it is being opened. When the first shutter member 50 is locked, the second shutter member 51 also is locked so that, as shown in FIG. 23, the first and second shutter members 50, 51 are both held in the opened state.

Accordingly, the turntable 68a or the like is moved toward the disk cartridge 20 or the disk cartridge 20 is moved toward the turntable 68a, whereby the optical disk 21 is loaded on the turntable 68a and the optical disk 69 is opposed to the information recording surface of the optical disk 21 with a predetermined space. Therefore, the disk recording and reproducing apparatus 60 becomes able to reproduce or record an information signal from or on the information recording surface of the optical disk 21.

Accordingly, while the recording and reproducing apparatus body 62 is being energized, the optical disk 21 is rotated through the turntable 68a by driving the spindle motor 68 and the optical head 69a is energized by driving the optical pickup device 69 to emit laser light to read out an information signal previously recorded on the information recording surface or to record a new information signal on the information recording surface. Thus, the recording and reproducing apparatus body 62 can reproduce a recorded information signal from the information recording surface of the optical disk 21 or record a new information signal on the information recording surface of the optical disk 21.

After the recorded information signal is reproduced from the information recording surface of the optical disk 21 or the new information signal is recorded on the information recording surface of the optical disk 21 as described above, when a cartridge eject button (not shown) provided on the disk recording and reproducing apparatus 60 is operated, the loading mechanism is energized and hence the disk cartridge 20 is ejected from the disk recording and reproducing apparatus 60. Specifically, when the disk cartridge 20 is moved toward the cartridge slot 66 by the eject operation of the loading mechanism, the operation portion 53d of the shutter mechanism 28 gripped by the grip portion of the shutter open and close mechanism is pushed with pressure.

As a result, when the disk cartridge 20 is moved by a predetermined distance so that the operation portion 53d is returned up to the vicinity of the through-hole 29c, the belt-like portion 50b is guided by the belt-like guide portion 30 and moved up to the position of the original closed state. Therefore, as shown in FIG. 20, the head areas of the opening portions 27, 38 are closed by the shutter portion 50a of the first shutter member 50.

At that very moment, since the end face of the belt-like guide portion 30 is located on the movement locus of the belt-like portion 50b owing to the opening portion 38 formed on the lower shell 24, when the tip end portion of the thick portion 53a is again entered into the belt-like guide portion 30 from the opening portion 38, there is a risk that the tip end portion of the thick portion 53a will be brought in contact with the peripheral edge portion which edges the belt-like guide portion 30. However, if the above peripheral edge portion is treated by chamfering, then the thick portion 53a can easily pass the belt-like guide portion 30, and hence there is eliminated a risk that the insertion of the thick portion 53a will be disturbed.

As the first shutter member 50 is being closed, the second shutter member 51 is rotated in the counter-clockwise direction in FIG. 23 and thereby moved. Thus, as shown in FIG. 20, the table areas of the opening portions 27, 38 are closed by the second shutter member 51 so that the whole of the opening portions 27, 38 is completely closed by the pair of the shutter members 50, 51.

At that very moment, when the belt-like portion 50b of the first shutter member 50 is pushed back to a predetermined position, the lock hole 54 bored on the thin portion 53b reaches the position of the lock lever 35b of the lock member 35. Since this lock lever 35b is constantly spring-biased toward the thin portion 53b under spring force of the spring piece 35d, when the lock hole 54 reaches a predetermined position, the lock lever 35b is entered into the lock hole 54. As a consequence, the first shutter member 50 is locked by the lock mechanism formed of the lock member 35. At the same time the first shutter member 50 is locked, the second shutter member 51 also is locked so that, as shown in FIG. 20, the first and second shutter members 50, 51 are both held in the closed state.

In this case, the lock mechanism formed of the lock member 35 for locking the belt-like portion 50b has a so-called one-way structure in which the first shutter member 50 is allowed to move only in the closing direction and is prohibited from being moved in the opposite direction. As a consequence, while the first shutter member 50 is being locked, when the operation portion 53d is applied with force for pulling the belt-like portion 50b or force for opening the shutter portion 50a, the lock lever 35b is engaged into the lock hole 54. Thus, even when force for releasing the shutter is applied to the lock mechanism while the belt-like portion 50b is being locked, the locked state brought by the lock member 35 can be prevented from being released and hence the first and second shutter members 50, 51 are both held in the closed state.

At that time, the thin portion 53b of the belt-like portion 50b of the first shutter member 50 is bent in the longitudinal direction and placed in the overstroke state as shown in FIG. 24A. As a result, even when the first shutter member 50 is closed completely, repulsion force can be prevented from being applied to the grip portion gripping the operation portion 53 as impulse force. Accordingly, it is possible to avoid the occurrence of disadvantages such as when the shutter open and close mechanism is damaged or the first shutter member 50 itself is damaged by repulsion force generated when the first shutter member 50 is closed. The thin portion 53b that has been bent and deformed at that time is returned to the original free state by an elasticity of the thin portion 53b itself when the grip portion is detached from the operation portion 53d as shown in FIG. 24B.

While the shutter mechanism 28 is being closed, the shutter portion 50a of the first shutter member 50 is entered between the inside shutter piece 51a and the outside shutter piece 51b of the second shutter member 51 formed as a U-like shape. Therefore, as shown in FIG. 15A, when the two shutter members 50, 51 are engaged with each other, a labyrinth function can be generated between the overlapping edges 57a and 57b. Owing to this labyrinth function, it is possible to suppress gas from being leaked out of a space between the two shutter members 50 and 51. Accordingly, it is possible to effectively suppress the disk cartridge 20 from being smudged by dusts or the like entered due to the flow of air. If the two shutter members are both formed as U-like shapes so that their overlapping edges are overlapped with each other, then the above labyrinth function can be enhanced more. Hence, the dustproof effect for protecting the disk cartridge 20 from dusts or the like can be demonstrated more effectively.

FIGS. 33 to 39 show the shutter mechanism of the disk cartridge 20 according to a second embodiment of the present invention. While a shutter mechanism 70 according to the second embodiment is common to the shutter mechanism 28 according to the first embodiment in that the shutter mechanism 70 is comprised of a first shutter member 71 and a second shutter member 72, the two shutter mechanisms 28, 70 definitely differ from each other in terms of a coupling structure for coupling the two shutter members 71, 72. Specifically, a novel feature of the shutter mechanism 70 according to the second embodiment lies in that efficiency of assembly can considerably be improved by partially assembling the two shutter members 71, 72.

Since shapes and arrangements of the first and second shutter members 71 and 72 are substantially similar to those of the first and second shutter members 50, 51 according to the first embodiment, approximately similar elements and parts are identified with identical reference numerals and therefore need not be described in detail. However, different elements and parts are marked with new reference numerals and will be described in detail.

First, elements and parts common to the first and second shutter members 71, 72 and the first and second shutter members 50, 51 will be described below. As shown in FIGS. 33 to 36, the first shutter member 71 includes the shutter portion 50a and the belt-like portion 50b having substantially similar shapes. The belt-like portion 50b has substantially a similar shape and arrangement and includes the thick portion 53a and the thin portion 53b. The thick portion 53a has the recess 53c formed thereon, and the thin portion 53b has the operation portion 53d and the lock hole 54 formed thereon. Then, the shutter portion 50a includes the arm portion 52, which is common to the shutter mechanism 28 according to the first embodiment. Moreover, the second shutter member 72 includes the barrel shaft portion 55a, which is also common to the shutter mechanism 28 according to the first embodiment.

Next, the points in which the first and second shutter members 71, 72 differ from the first and second shutter members 50, 51 will be described below. At the tip end portion of the arm portion 52 of the first shutter member 71, there is provided an L-shaped shaft portion 73. As shown in FIGS. 37A, 37B and FIGS. 38A, 38B, the L-shaped shaft portion 73 includes a shaft portion 73a projected toward one surface and a projected portion 73b continued to the tip end portion of this shaft portion 73a and which is projected toward both sides of the diametrical direction. While the projected portion 73b is projected to one side by a large amount, the first shutter member 71 has an engagement hole 74 formed of an oblong hole of a size large enough to introduce the projected portion 73b. Directions of the engagement hole 74 and the projected portion 73b are set in such a manner that their longitudinal directions can be prevented from being matched with each other while the shutter mechanism 70 is being placed in any one of the closed state to the opened state.

The first shutter member 71 and the second shutter member 72 have structures such that they butt each other by their end faces. The first and second shutter members 71 and 72 are adapted to close the opening portions 27, 28 by contacting their butt portions 71a, 72a with each other. Specifically, while the butt portion 71a of the first shutter member 71 includes a concave portion 75, the butt portion 72a of the second shutter member 72 includes a convex portion 76 which is engaged with the concave portion 75. The concave portion 75 and the convex portion 76 are shaped as cross-sectional shapes shown in FIG. 39A.

The concave portion 75 of the first shutter member 71 is formed of a wedge-like (V-like) concave having an inclined surface 75a formed on one surface side. The concave portion 75 comprised of an oblong groove is formed by extending this concavity over substantially the entire length of the butt portion 71a. On the other hand, the convex portion 76 has a cross-sectional shape corresponding to the concave portion 75 and is formed of a wedge-like (V-like) protrusion having an inclined surface 76a on one surface side. The convex portion 76 comprised of the protrusion is formed by extending this protrusion over substantially the entire length of the butt portion 72a. In this manner, with the arrangement in which the convex portion 75 and the concave portion 76 are formed on the butt portions 71a, 72a and the opening portions 27, 38 are closed under the condition that the convex portion 75 and the concave portion 76 are meshed with each other, it is possible to effectively prevent dusts or the like from entering the cartridge housing 22 from the butt surfaces of the butt portions 71a, 72a.

At an opening portion of a horizontal surface of the concave portion 75, there is provided an inclined surface 75b which is inclined in the opposite side of the inclined surface 75a. This inclined surface 75b is used to guide the convex portion 76 so that the convex portion 76 can easily be engaged with the concave portion 75.

As shown in FIGS. 33 to 36, the first shutter member 71 and the second shutter member 72 include a lock mechanism 77 for locking the engaged shutter member when they are engaged with each other. This lock mechanism 77 is comprised of a lock receiving portion 78 provided on the first shutter member 71 and a lock portion 79 provided on the second shutter member 72. The lock receiving portion 78 is formed of a circular recess which is opened to the end face side of the butt portion 71a. The lock receiving portion 78 generates a sense of click when its exit is slightly narrowed.

On the other hand, the lock portion 79 is comprised of a pair of elastic lock pieces. A tip end portion of each lock piece is formed as a circular arc-shape to make the whole of the lock portion 79 become roundish so that the lock portion 79 can be made detachable relative to the lock receiving portion 78. The two shutter members 71, 72 can partially be assembled and held in a predetermined shape by using this lock mechanism 77. Accordingly, the lock mechanism 77 can partially be assembled and the efficiency of the assembly operation can be improved.

The shutter mechanism 70 according to the second embodiment can be partially assembled as follows.

Figure 38A:
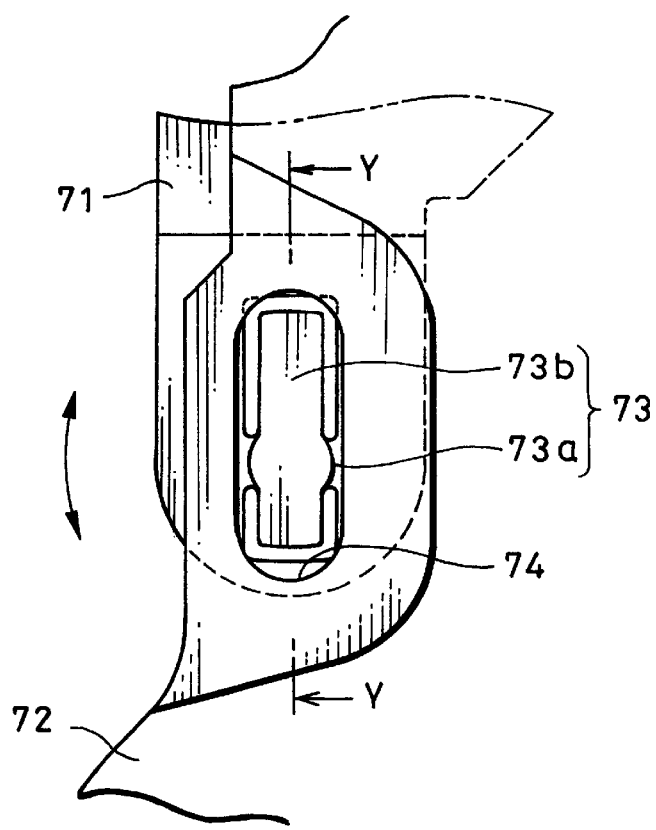
Figure 38B:
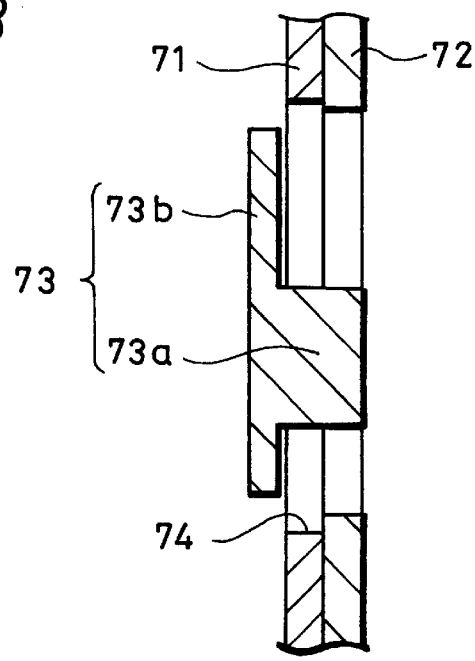

First, as shown in FIG. 38A, the L-like shaft portion 73 of the first shutter member 71 is faced to the engagement hole 74 of the second shutter member 72 and the longitudinal direction of the projected portion 73b is matched with that of the engagement hole 74. In this state, as shown in FIG. 38A, the projected portion 73b is extended through the engagement hole 74. Thereafter, the two shutter members 71, 72 are relatively rotated and displaced, whereby the partial assembly of the pair of the shutter members 71, 72 is finished.

Figure 37A:
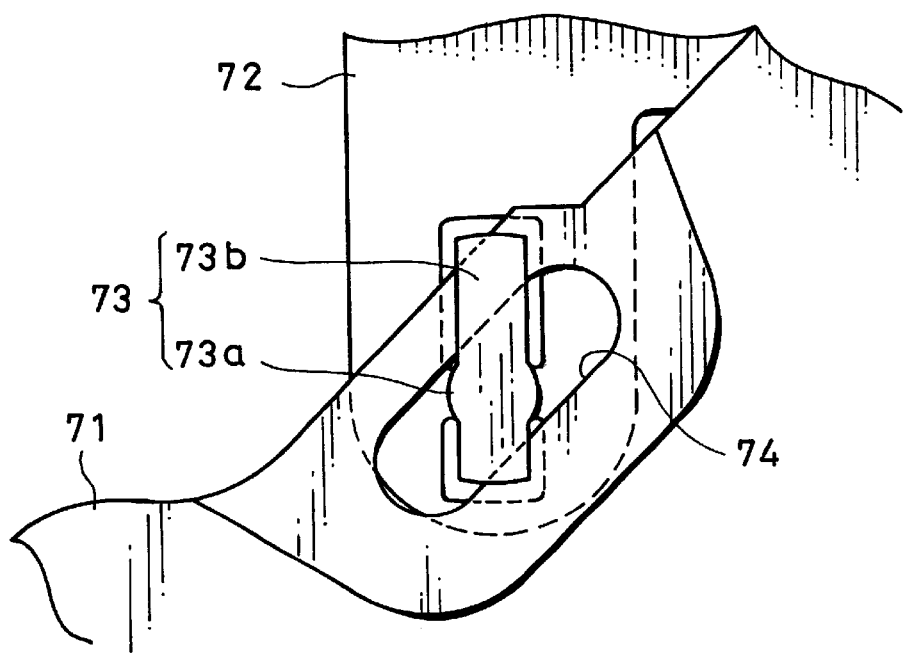
Figure 37B:
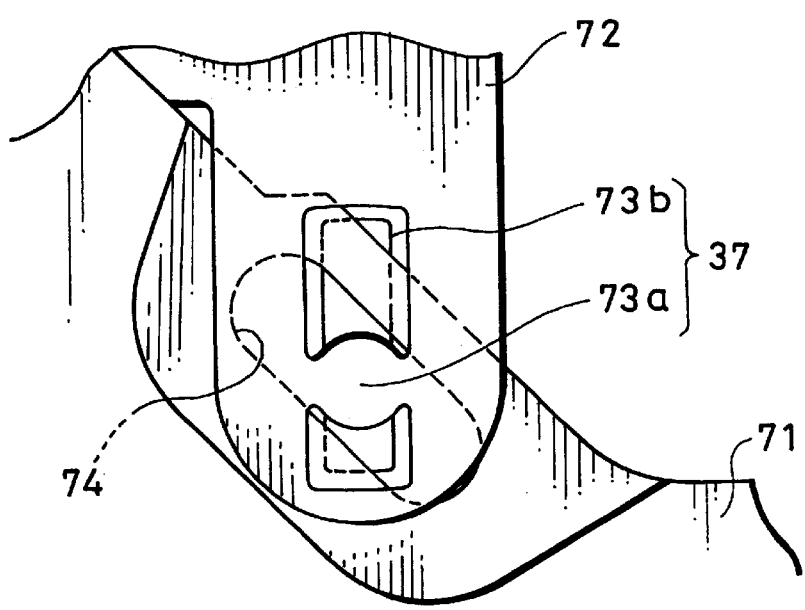

At that very moment, as shown in FIGS. 37A, 37B, since both ends of the longitudinal direction of the projected portion 73b are respectively engaged with the edge of the engagement hole 74, there is no risk that the engagement state between the L-like shaft portion 73 and the engagement hole 74 will be released. The engagement state between the L-like shaft portion 73 and the engagement hole 74 can be maintained in all of the states ranging from the state in which the shutter mechanism 70 is being opened as shown in FIGS. 33, 34 to the state in which the shutter mechanism 70 is being closed as shown in FIGS. 35, 36. Accordingly, while the shutter mechanism 70 is either being opened or being closed, a problem such as disengagement can be prevented from arising on the pair of the shutter member 71, 72. Further, the shutter mechanism 70 according to the second embodiment can smoothly be opened and closed similarly to the shutter mechanism 28 according to the first embodiment.

While the present invention has been described so far, the present invention is not limited to the above first and second embodiments. For example, while the optical disk is used as the example of the information recording medium as described above, the present invention is not limited thereto and can be applied to magnetic disks such as a magneto-optical disk and a floppy disk and various disk-like recording mediums. Further, while the information recording and reproducing apparatus is applied to the disk recording and reproducing apparatus which can record and reproduce an information signal as described above, the present invention is not limited thereto and it is needless to say that the present invention can be also applied to a disk recording apparatus capable of only recording an information signal or a disk reproducing apparatus capable of only reproducing an information signal.

While the opening portions 27, 28 are formed on the lower shell 24 and the middle shell 25 of the cartridge housing 22 as described above, the present invention is not limited thereto. Conversely, the opening portions can be formed on the upper shell 23 or the opening portions can be formed on the lower shell 24, the middle shell 25 and the upper shell 23 so that the disk-like recording medium can be accessed simultaneously from the upper direction and the lower direction of the cartridge housing. As described above, the present invention can be variously modified without departing from the gist thereof.

As described above, according to the present invention, in the disk cartridge including the cartridge housing, the disk-like recording medium and the shutter mechanism, since the concave portion is formed on the butt portion of at least one shutter member and the openable and closable lid is rotated along the plane of the flat surface portion of the cartridge housing, when the shutter mechanism is closed, the butt portion of one shutter member overlaps with the butt portion of the other shutter member. As a consequence, the labyrinth function can be demonstrated between the pair of the shutter members, whereby fluid can be made difficult to pass through the butt portions and dusts or the like can be made difficult to enter the cartridge housing. There can be provided a disk cartridge which is excellent in dustproof property.

According to the disk cartridge of the present invention, since the protrusion is formed on one shutter member and the oblong hole is bored on the butt portion of the other shutter member, while the shutter of the shutter mechanism is being closed, the protrusion of one shutter member is entered into the oblong hole of the other shutter member and the labyrinth function is demonstrated by a combination of the protrusion and the oblong hole. Therefore, since the opening portions can be more reliably closed by the pair of the shutter members, it is possible to provide the highly-dustproof disk cartridge which can effectively prevent dusts or the like from being entered into the disk cartridge.

According to the disk cartridge of the present invention, since the inclined surface is formed on one surface of the protrusion and the inclined surface having approximately the same inclination is formed on one surface of the oblong hole opposing the protrusion, a very small space between the pair of the shutter members can be made constant and a more highly-dustproof property can be maintained. Therefore, it is possible to provide a disk cartridge which is excellent in dustproof property.

According to the disk cartridge of the present invention, since the length of the protrusion is made longer than that of the oblong hole, dimensional errors and assembly errors of the pair of the shutter members can be absorbed by the protrusion and the oblong hole so that the dustproof property can be improved and dusts or the like can effectively be prevented from entering into the disk cartridge. Thus, there can be provided the disk cartridge which is excellent in dustproof property.

According to the disk cartridge of the present invention, since the protrusion and the oblong hole are respectively formed on the butt portions of the pair of the shutter members, while the shutter of the shutter mechanism is being closed, the oblong hole and the protrusion are engaged with the oblong hole and the protrusion of the other shutter member, respectively. Therefore, the opening portions can be more reliably closed by the pair of the shutter members, and there can be provided the highly-dustproof disk cartridge in which dusts or the like can effectively be prevented from being entered into the disk cartridge.

Further, according to the disk cartridge of the present invention, since the shutter portions of the pair of the shutter members are shaped as substantially triangles and are combined in such a manner that their long sides are overlapping with each other, the shutter portion shaped as substantially rectangle can be formed by a combination of two substantially triangular shutter portions. Therefore, there can be achieved an effect that the relatively large opening portion formed of the wide and long recess can be opened and closed reliably.

Furthermore, according to the disk cartridge of the present invention, since one shutter member is supported to the disk cartridge so as to become freely rotatable, the other shutter member is supported to this shutter member so as to become freely rotatable and the belt-like portion having the projected tip end portion is provided on the outside of the cartridge housing, without using additional assemblies such as a return spring, the pair of the shutter members can be rotated with application of external force to the tip end portion of the belt-like portion such that they can come near to each other or come away from each other. Accordingly, there can be achieved an effect that the relatively large opening portion formed of the wide and long recess provided on the cartridge housing can be opened and closed reliably and smoothly.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A disk cartridge comprising:
 a cartridge housing formed of a pair of shells so as to form therein a disk compartment;
 a disk recording medium accommodated within said disk compartment so as to become freely rotatable; and
 a shutter mechanism having a pair of shutter members attached to said cartridge housing, said pair of shutter members rotatably coupled to each other and respective shutter portions being butted to each other to close an opening portion of said cartridge housing when said shutter members are being closed, wherein a butt portion of at least one of said pair of shutter members has a concave portion with which a butt portion of the other shutter member is engaged.

2. A disk cartridge according to claim 1, wherein said butt portion of said one shutter member has a protrusion extended in the direction intersecting a thickness direction of said shutter member and said butt portion of said other shutter member has an oblong hole with which said protrusion is engaged.

3. A disk cartridge according to claim 2, wherein said protrusion has a slope surface formed at least at its one surface intersecting its longitudinal direction and said oblong hole has a slope surface having approximately similar inclination at its surface opposing to said slope surface.

4. A disk cartridge according to claim 2, wherein said length in the longitudinal direction of said oblong hole is longer than said length in the longitudinal direction of said protrusion and a pair of shutter members can be relatively moved in said longitudinal direction.

5. A disk cartridge according to claim 1, wherein said butt portions of said pair of shutter members include protrusions extended in the directions intersecting the thickness direction and an oblong hole with which a protrusion formed on the butt portion of the other shutter member is engaged.

6. A disk cartridge according to claim 1, wherein said respective shutter portions of said pair of shutter members are shaped as substantially triangles and long sides of said triangles are butted so as to form the whole of the shutter portion as substantially a rectangle.

7. A disk cartridge according to claim 6, wherein one shutter member of said pair of shutter members is rotatably supported to said disk cartridge, the other shutter member is rotatably supported to one shutter member and includes a belt portion the tip end portion of which is protruded to the outside of said cartridge housing and said pair of shutter members can be opened and closed with application of external force to said belt portion.

8. A disk cartridge comprising:

a cartridge housing having a disk compartment formed therein;

a freely rotatable disk recording medium accommodated within said disk compartment; and a shutter mechanism having a pair of shutter members attached to said cartridge housing, said pair of shutter members being rotatably coupled to each other and having respective shutter portions butted to each other to close an opening portion of said cartridge housing when said shutter members are closed, wherein a butt portion of one of said pair of shutter members has a concave portion with which a butt portion of the other shutter member is engaged.

* * * * *